(12) United States Patent
Deguchi et al.

(10) Patent No.: US 6,278,915 B1
(45) Date of Patent: Aug. 21, 2001

(54) DRIVING FORCE CONTROL SYSTEM FOR AUTOMOTIVE VEHICLE

(75) Inventors: Yoshitaka Deguchi; Taketoshi Kawabe; Itsuro Muramoto, all of Yokohama; Kouichi Kuroda, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/501,299

(22) Filed: Feb. 9, 2000

(30) Foreign Application Priority Data

Feb. 17, 1999 (JP) .................................................. 11-038697

(51) Int. Cl.$^7$ .................................................. B60K 41/12
(52) U.S. Cl. .............................. 701/22; 701/84; 701/87; 477/46; 477/3; 180/65.2; 180/65.3
(58) Field of Search .................................. 701/22, 84, 87, 701/90, 81, 54; 477/5, 3, 6, 8, 13, 45, 15, 44; 180/65.2–65.6

(56) References Cited

U.S. PATENT DOCUMENTS 5,751,137 * 5/1998 Kiuchi et al. .......................... 322/14
6,122,887 * 9/2000 Takahara et al. ...................... 701/78

* cited by examiner

*Primary Examiner*—William A. Cuchlinski, Jr.
*Assistant Examiner*—Marthe Marc-Coleman
(74) *Attorney, Agent, or Firm*—Foley & Lardner

(57) ABSTRACT

A driving force control system for an automotive vehicle using driving torque produced by at least one of an internal combustion engine and an electric motor for propulsion, and including a battery and a power-transmission mechanism having a continuously variable transmission, comprises sensors detecting vehicle speed, engine speed, an accelerator operating amount, a state of charge of the battery. An electronic control unit calculates a target engine speed needed to realize the vehicle speed, the target driving torque and the target generated electric energy at the lowest fuel consumption, considering an efficiency of each of the engine, the electric motor, and the power-transmission mechanism, so as to operate the engine, the electric motor, and/or the power-transmission mechanism always at their optimum operating points depending on the ratio of a first time rate of doing work for the driver's required driving torque to a second time rate of doing work for the required generated electric energy, as well as the sum of the first and second time rates.

28 Claims, 10 Drawing Sheets

… target driving torque on the basis of the vehicle speed and the accelerator operating amount, a target generated-electric-energy calculation section which calculates a target generated electric energy on the basis of a deviation of the state of charge of the battery from a desired state of charge, a target engine-speed calculation section which calculates a target engine speed needed to realize the vehicle speed, the target driving torque and the target generated electric energy at a lowest fuel consumption, considering an efficiency of each of the engine, the electric motor, and the power-transmission mechanism, a target motor-rotational-speed calculation section which calculates a target motor rotational speed needed to realize the vehicle speed and the target driving torque at a lowest electric power consumption, considering an efficiency of each of the electric motor and the power-transmission mechanism, a target torque calculation section which calculates a target engine torque of the engine and a target motor torque of the electric motor, both needed to realize the target driving torque and the target generated electric energy, a transmission ratio control section which controls a transmission ratio of the continuously variable transmission so that the motor rotational speed is adjusted to the target motor rotational speed when the clutch is in the disengaged state, and so that the engine speed is adjusted to the target engine speed when the clutch is in the engaged state, an engine torque control section which controls the engine so that torque produced by the engine is adjusted to the target engine torque, and a motor torque control section which controls the electric motor so that torque produced by the electric motor is adjusted to the target motor torque.

According to a still further aspect of the invention, a driving force control system for an automotive vehicle using driving torque produced by at least one of an internal combustion engine and an electric motor for propulsion, and including a battery giving and receiving electricity to and from the electric motor, a clutch disposed between the engine and electric motor, and a power-transmission mechanism having at least a continuously variable transmission for transmitting the driving torque therevia to drive wheels, and capable of selecting one of application of driving torque produced by the engine, application of driving torque produced by the electric motor, and application of driving torque produced by the engine and the motor depending on whether a clutch-engagement request is present or a clutch-disengagement request is present, the system comprising a vehicle speed sensor detecting vehicle speed, an engine speed sensor detecting engine speed of the engine, a motor speed sensor detecting a motor rotational speed of the electric motor, an accelerator sensor detecting an accelerator operating amount, a battery state-of-charge detection device detecting a state of charge of the battery, and a control unit being configured to be electrically connected to the vehicle sensor, the engine speed sensor, the motor speed sensor, the accelerator sensor, the battery state-of-charge detection device, the continuously variable transmission, the engine, and the electric motor, the control unit comprising a target driving-torque calculation section which calculates a target driving torque on the basis of the vehicle speed and the accelerator operating amount, a target generated-electric-energy calculation section which calculates a target generated electric energy on the basis of a deviation of the state of charge of the battery from a desired state of charge, a target engine-speed calculation section which calculates a target engine speed needed to realize the vehicle speed, the target driving torque and the target generated electric energy at a lowest fuel consumption, considering an efficiency of each of the engine, the electric motor, and the power-transmission mechanism, a target motor-rotational-speed calculation section which calculates a target motor rotational speed needed to realize the vehicle speed and the target driving torque at a lowest electric power consumption, considering an efficiency of each of the electric motor and the power-transmission mechanism, a target torque calculation section which calculates a target engine torque of the engine and a target motor torque of the electric motor, both needed to realize the target driving torque and the target generated electric energy, a transmission ratio control section which controls a transmission ratio of the continuously variable transmission so that the motor rotational speed is adjusted to the target motor rotational speed when the clutch-disengagement request is present, and so that the engine speed is adjusted to the target engine speed when the clutch-engagement request is present, an engine torque control section which controls the engine so that torque produced by the engine is adjusted to the target engine torque, and a motor torque control section which controls the electric motor so that torque produced by the electric motor is adjusted to the target motor torque.

It is preferable that the target engine-speed calculation section calculates the target engine speed, so that the electric motor can generate electricity at a higher electric-energy-generation efficiency, as a rate of the target generated electric energy with respect to a sum of the target generated electric energy and a target driving force proportional to a product of the vehicle speed and the target driving torque becomes higher. The target engine-speed calculation section may calculate the target engine speed, so that the power-transmission mechanism can transmit power at a higher power-transmission efficiency, as a rate of a target driving force proportional to a product of the vehicle speed and the target driving torque with respect to a sum of the target generated electric energy and the target driving force becomes higher. More preferably, during low engine load, the target engine-speed calculation section may set the target engine speed at a higher value, as a rate of the target generated electric energy with respect to a sum of the target generated electric energy and a target driving force proportional to a product of the vehicle speed and the target driving torque becomes higher. During low engine load, the target engine-speed calculation section may set the target engine speed at a lower value, as a rate of a target driving force proportional to a product of the vehicle speed and the target driving torque with respect to a sum of the target generated electric energy and the target driving force becomes higher.

According to another aspect of the invention, a driving force control system for a parallel hybrid vehicle using driving torque produced by at least one of an internal combustion engine and an electric motor for propulsion, and including a battery giving and receiving electricity to and from the electric motor and a power-transmission mechanism having at least a continuously variable transmission for transmitting the driving torque therevia to drive wheels, the system comprising a vehicle speed sensor detecting vehicle speed, an engine speed sensor detecting engine speed of the engine, an accelerator sensor detecting an accelerator operating amount, a battery state-of-charge detection device detecting a state of charge of the battery, and a control unit being configured to be electrically connected to the vehicle sensor, the engine speed sensor, the accelerator sensor, the battery state-of-charge detection device, the continuously variable transmission, the engine, and the electric motor, the control unit comprising a target driving-torque calculation means for calculating a target driving torque on the basis of the vehicle speed and the accelerator operating amount, a target generated-electric-energy calculation means for calculating a target generated electric energy on the basis of a deviation of the state of charge of the battery from a desired state of charge, a target engine-speed calculation means for calculating a target engine speed needed to realize the vehicle speed, the target driving torque and the target generated electric energy at a lowest fuel consumption, considering an efficiency of each of the engine, the electric motor, and the power-transmission mechanism, a target torque calculation means for calculating a target engine torque of the engine and a target motor torque of the electric motor, both needed to realize the target driving torque and the target generated electric energy, a transmission ratio control means for controlling a transmission ratio of the continuously variable transmission so that the engine speed is adjusted to the target engine speed, an engine torque control means for controlling the engine so that torque produced by the engine is adjusted to the target engine torque, and a motor torque control means for controlling the electric motor so that torque produced by the electric motor is adjusted to the target motor torque.

DESCRIPTION OF THE PREFERRED EMBODIMENTS

Figure 1:
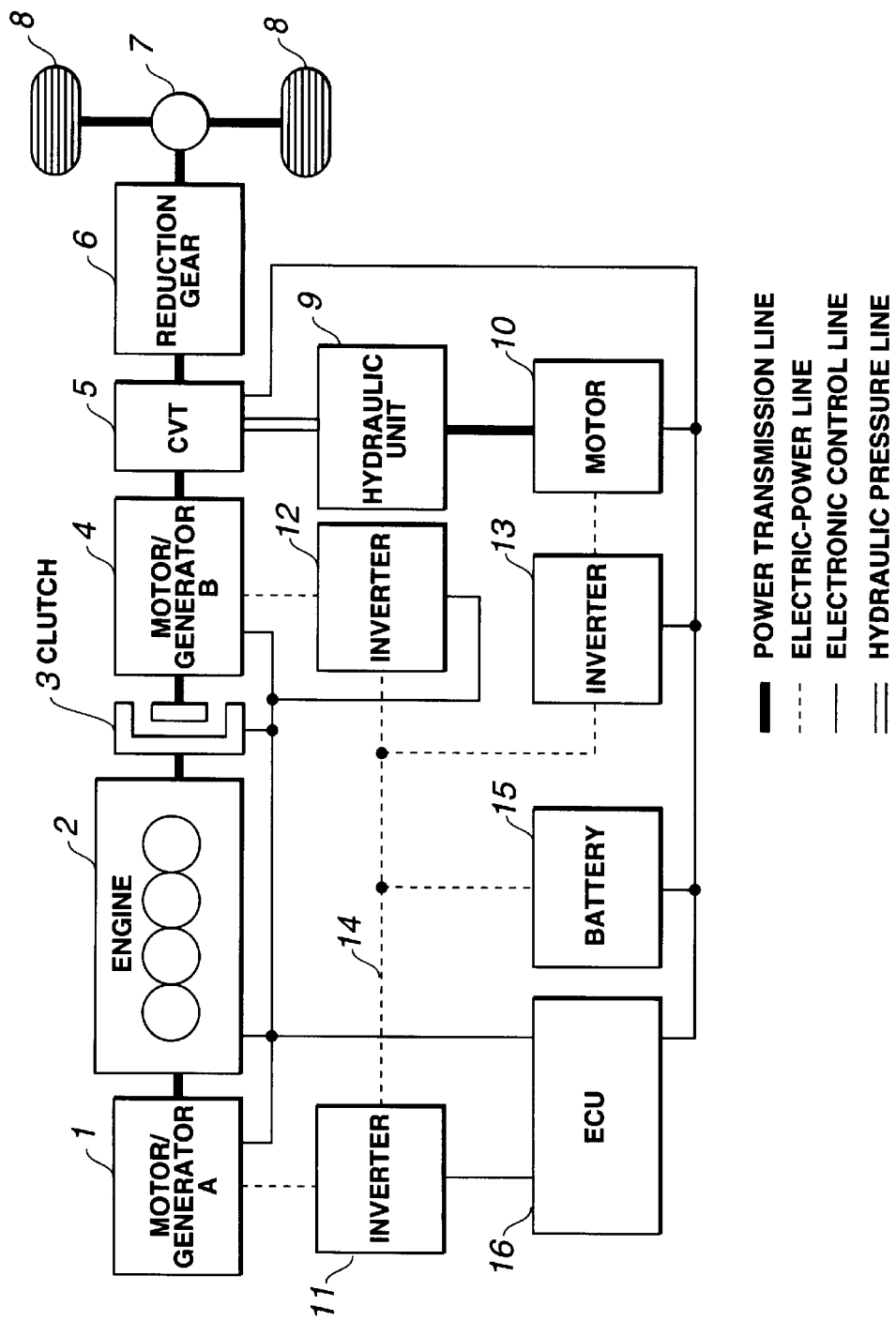
FIG. 1 is a system block diagram illustrating one embodiment of a driving force control system of the invention, exemplified in a parallel hybrid vehicle.
Figure 2:
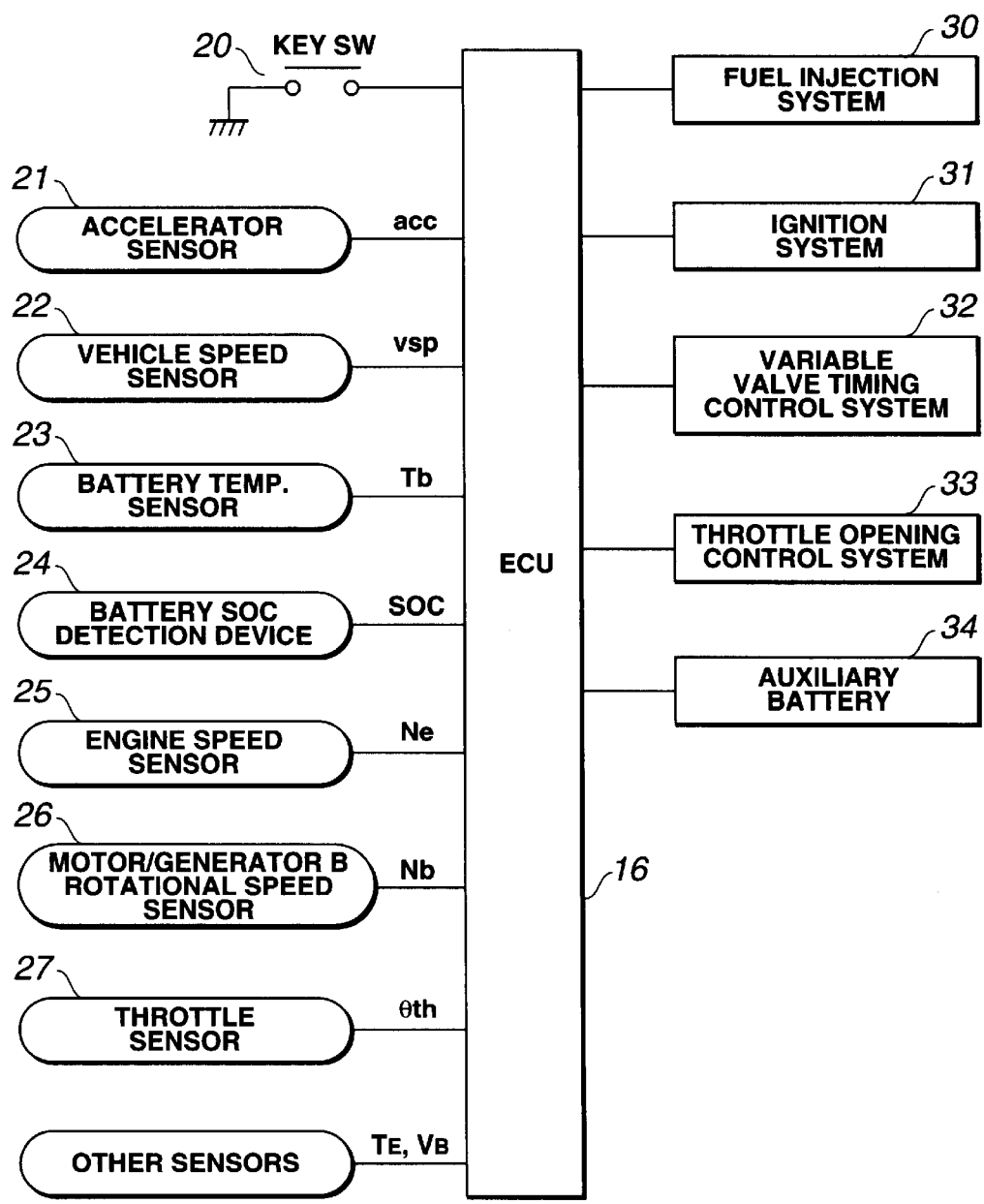
FIG. 2 is a block diagram illustrating a control circuit incorporated in the driving force control system of the embodiment shown in FIG. 1.

Referring now to the drawings, particularly to FIG. 1, there is shown a system layout of the driving force control system of the embodiment. As seen in FIG. 1, the driving force control system of the embodiment is exemplified in a parallel hybrid vehicle employing a parallel hybrid system using both an internal combustion engine and an electric motor/generator for propulsion. In FIG. 1, the heavy solid line denotes a power transmission line, the broken line denotes an electric-power line, the fine solid line denotes an electronic control line, and the double line denotes a hydraulic pressure line. The power train of the hybrid vehicle shown in FIG. 1 is constructed by a motor/generator 1, an internal combustion engine 2, a clutch 3, a motor/generator 4, a continuously variable automatic transmission (often abbreviated to "CVT") 5, a reduction gear 6, a differential gear 7, a pair of axle driveshafts (not numbered), and drive wheels 8. The output shaft of the motor/generator 1, the output shaft of the engine 2, and the input shaft of the clutch 3 are connected to each other. The output shaft of the clutch 3, the output shaft of the motor/generator 4, and the input shaft of the CVT 5 are connected to each other. As seen in FIG. 1, when the clutch 3 is engaged, a driving force generated by the engine 2 and a driving force generated by the motor/generator 4 are both transmitted through the CVT 5, the reduction gear 6, and the differential 7 to the drive wheels 8. That is to say, with the clutch 3 engaged, the engine 2 and the motor/generator 4 both serve as a propelling power source for the hybrid vehicle. To the contrary, when the clutch 3 is disengaged, only the driving force generated by the motor/generator 4 is transmitted through the CVT 5, the reduction gear 6, and the differential 7 to the drive wheels 8. With the clutch 3 disengaged, only the motor/generator 4 serves as a propelling power source for the vehicle. The three torque-transmission elements, namely the continuously variable transmission (CVT) 5, the reduction gear 6, and the differential 7 will be hereinafter referred to as a "power-transmission mechanism". The CVT 5 is comprised of a belt type continuously variable automatic transmission, a toroidal type continuously variable automatic transmission, or the like. The hydraulic unit 9 is fluidly connected to the CVT 5 to supply pressurized oil (properly regulated hydraulic pressure) to the CVT 5, in order for the speed-change ratio of the CVT to be steplessly variable and for lubrication. If the CVT 5 comprises a belt type CVT, two sorts of regulated hydraulic pressures produced by the hydraulic unit 9 are respectively fed into a driving-pulley (a primary-pulley) actuation hydraulic actuator and a driven-pulley (a secondary-pulley) actuation hydraulic actuator for continuously changing effective diameters of the primary and secondary—driving and driven—pulleys. If the CVT 5 comprises a toroidal CVT, the hydraulic unit 9 produces the regulated hydraulic pressure to continuously change both the high contact-pressure point between an input disc and a power roller and the high contact-pressure point between an output disc and the power roller, so that traction oil transmits power using its shearing force at high contact pressure. As a hydraulic pressure source, the hydraulic unit 9 has an oil pump (not shown). The oil pump of the hydraulic unit 9 is driven by means of a motor 10. Each of the motor/generator 1 (the motor/generator A) and the motor/generator 4 (the motor/generator B) is comprised of an alternating current electric motor/generator (a.c. motor/generator) such as a three-phase synchronous motor/generator, a three-phase induction motor/generator, or the like. The motor 10 is comprised of an alternating current electric motor (a.c. motor) such as a three-phase synchronous motor, a three-phase induction motor, or the like. The motor/generator 1 serves mainly to start up the engine 2 and to generate electricity (electric energy). The motor/generator 4 serves mainly as a propulsion motor and as a regenerative braking device. On the other hand, the motor 10 serves to drive the oil pump of the hydraulic unit 9. In the shown embodiment, each of the motor/generator 1 and the motor/generator 4 comprises an a.c. motor/generator, whereas the motor 10 comprises an a.c. electric motor. Alternatively, each of the motor/generator 1 and the motor/generator 4 may comprise a d.c. electric motor/generator, whereas the motor 10 may comprise a d.c. electric motor. Furthermore, when the clutch 3 is engaged, the motor/generator 1 may be used as a propulsion motor and a regenerative braking device, whereas the motor/generator 4 may be used as an engine start-up motor as well as a generator. In the shown embodiment, the clutch 3 comprises a powder clutch which is capable of adjusting the magnitude of torque transmitted therethrough. In lieu of the use of a powder clutch, a dry single disc clutch or a wet multiple disc clutch may be used. Electric energy is supplied via an inverter 11 to the a.c. motor/generator 1, and also supplied via an inverter 12 to the a.c. motor/generator 4. In the same manner, electric energy is supplied via an inverter 13 to the a.c. motor 10. If each of the motor/generator 1 and the motor/generator 4 comprises a d.c. motor/generator and the motor 10 comprises a d.c. motor, a dc to dc converter is used in lieu of a dc to ac inverter (11, 12, 13). The inverters 11, 12, and 13 are electrically connected to a main battery 15 via a common DC link 14. As hereunder described in detail, the main battery 15 is provided to give and receive electricity to and from each of the motor/generators 1 and 4. In the embodiment, d.c. electric power stored in the main battery 15 is inverted into a.c. electric power via the inverters 11, 12, and 13, and then the a.c. electric power is supplied via the common DC link 14 to the motor/generators 1 and 4 and to the motor 10. The inverters 11 and 12 associated with the respective motor/generators 1 and 4 also serve to convert a.c. electric power generated by the motor/generators 1 and 4 to d.c. electric power so as to recharge the main battery 15. The use of the common DC link 14 enables one of the two motor/generators 1 and 4, when in a regenerative state, to directly supply electric power to the motor 10 or to the other motor/generator in a power running state. In this case, the electric power is not supplied from the main battery 15. A lithium-ion battery, a nickel-hydride battery, a lead-acid storage battery or the like, or an electrical double layer capacitor unit, often called "power capacitor unit" can be used as the main battery. The electronic control unit (ECU) or the electronic control module (ECM) or the controller 16 is provided for electronically controlling the parallel hybrid system of the embodiment. The ECU 16 comprises a microcomputer, peripheral parts of the microcomputer, and various kinds of actuators, for controlling engine speed and torque output of the engine 2, the magnitude of torque transmitted through the clutch 3, a rotational speed of each of the motor/generators 1 and 4 and the motor 10, the magnitude of torque generated by each of the motor/generators 1 and 4 and the motor 10, and a transmission ratio (or a speed-change ratio) of the CVT 5. As clearly seen in FIG. 2, the input interface of the ECU 16 is connected to a key switch 20, an accelerator sensor 21, a vehicle speed sensor 22, a battery temperature sensor 23, a battery state-of-charge (SOC) detection device 24, an engine speed sensor 25, a motor/generator-B rotational speed sensor 26, and a throttle sensor 27 to receive various engine/vehicle sensor signals and the key switch signal. As described later, the input interface of the ECU 16 may preferably be connected to the other sensors, that is, an engine temperature sensor (or an engine coolant temperature sensor) and a battery-terminal voltage sensor, to monitor engine temperature (engine coolant temperature TE) and the terminal voltage VB of the main battery 15. The key switch 20 is closed when an ignition key of the vehicle is held at an ON position or at a START position. Therefore, the ECU 16 can determine turned-ON or turned-OFF states depending on an ON signal or an OFF signal from the key switch 20. The accelerator sensor 21 generally serves as an engine load sensor and actually detects the degree of depression of the accelerator, i.e., the accelerator opening acc [degree] (or an accelerator operating amount of the accelerator pedal). The vehicle speed sensor 22 is provided to detect vehicle speed vsp [km/h]. Usually, the vehicle speed sensor 22 corresponds to a CVT output-shaft rotational speed sensor. The battery temperature sensor 23 is provided to detect a battery temperature Tb [° C.] of the main battery 15. The battery SOC detection device 24 is provided to detect a state of charge (or a charging rate [%]) of the main battery 15. The engine speed sensor 25 is provided to detect engine speed Ne [rpm] of the engine 2. The motor/generator-B rotational speed sensor 26 is provided to detect a rotational speed Nb [rpm] of the motor/generator B (the motor/generator 4). The throttle sensor 26 is provided for detecting a throttle opening $\theta_{th}$ [ degree ] of the engine 2. The output interface of the ECU 16 is connected to an electronic fuel injection system 30, an electronic ignition system 31, a variable valve timing control system (or a variable valve timing/lift control system) 32, and a throttle opening control system 33. An auxiliary battery 34 is connected to the ECU 16 to supply electric power to the control unit 16. The ECU 16 electronically controls the electronic fuel injection system 30 and consequently controls fuel supply, fuel cutoff, and an actual fuel-injection amount. An ignition timing is determined on the basis of both the engine speed Ne detected by the engine speed sensor 25 and the engine load estimated from an accelerator opening acc detected by the accelerator sensor 21. The ECU 16 controls the variable valve timing control system 32 to variably adjust an intake-valve closure timing (IVC), an intake-valve open timing (IVO), an exhaust-valve closure timing (EVC), and an exhaust-valve open timing (EVO), depending upon the engine/vehicle operating conditions. The ECU 16 also controls the throttle opening control system 33 to adjust the throttle opening 0 th of the engine 2. Each fuel injector of the engine 2 is controlled depending on the fuel injection amount determined, whereas a spark plug of each engine cylinder is fired depending on the ignition timing determined. The throttle opening control system 33 comprises an electronically-controlled throttle. The electronically-controlled throttle is disposed in an intake-air passage of an induction system and is not mechanically linked to the accelerator pedal for electronically arbitrarily controlling the throttle opening $\theta_{th}$ depending on depression of the accelerator pedal. By virtue of the provision of the electronically-controlled throttle, the throttle opening $\theta_{th}$ can be adjusted independently of the depression amount acc of the accelerator pedal. To enhance the accuracy of the opening/closing control for the throttle, the electronically-controlled throttle often uses a stepper motor. In order for the engine 2 to produce a desired output torque, the opening and closing of the throttle valve is precisely controlled or regulated by means of the stepper motor with less time lag.

Figure 3:
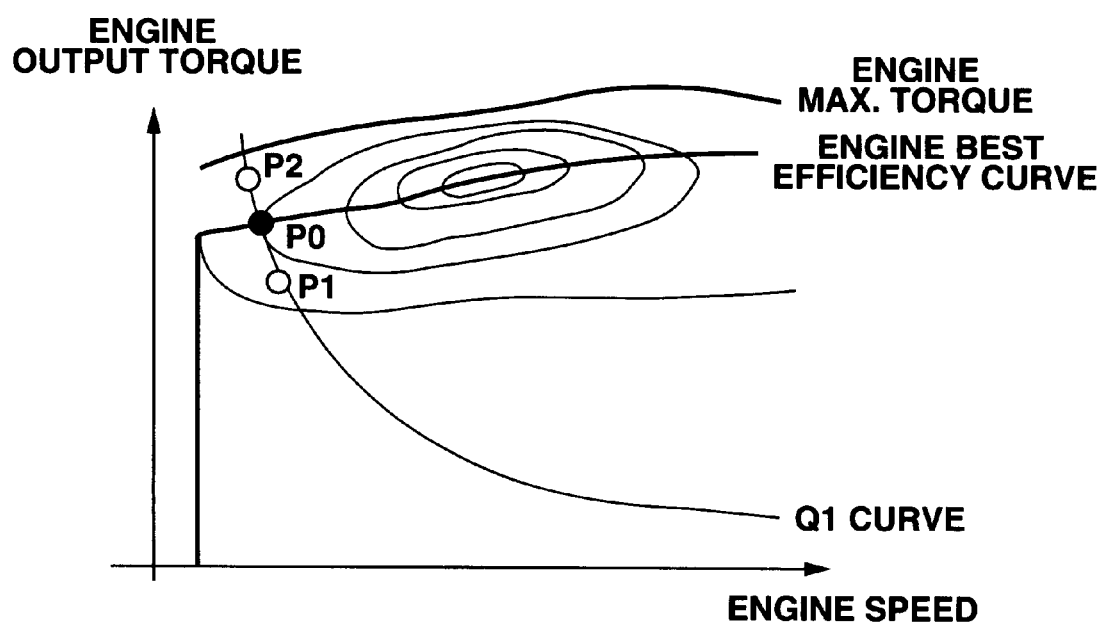
FIG. 3 is a characteristic diagram illustrating the relationship among engine speed, engine output torque, the best engine efficiency curve, and the mechanical power Q1 (the sum of a time rate of doing work for the driver's required driving torque and a time rate of doing work for the required generated electric energy), used to determine the best engine operating point.

Hereinafter explained in reference to the characteristic diagram shown in FIG. 3 are details of a method for determining an engine operating point of the best engine efficiency in the internal combustion engine, performed by the system of the embodiment.

Assuming that the sum of a time rate of doing work for the driver's required driving torque and a time rate of doing work for the required generated electric energy is a certain mechanical power Q1 [kw], as appreciated from the characteristic diagram of FIG. 3, the engine operating point of the best efficiency (i.e., the lowest fuel consumption rate) can be generally determined as an intersection point P0 of the Q1 curve and the best engine efficiency curve. The best engine efficiency curve is plotted on the two-dimensional plane defined by the axis of ordinate indicative of engine output torque and the axis of abscissa indicative of engine speed Ne. The Q1 curve represents a constant characteristic curve of a certain mechanical efficiency Q1 relative to both the engine speed and the engine output torque. In FIG. 3, the uppermost solid line indicates the engine maximum torque curve showing how the engine maximum torque varies relative to the engine speed. These characteristic curves are usually stored in the memory of the ECU 16 in the form of map data. As discussed above, generally, the engine operating point of the best efficiency (i.e., the lowest fuel consumption) can be determined as the intersection point P0 of the Q1 curve and the engine best efficiency curve. The time rate of doing work for the driver's required driving torque will be hereinafter referred to as a "required-driving-torque dependent power", whereas the time rate of doing work for the required generated electric energy will be hereinafter referred to as a "required-electric-energy-generation dependent power". The inventors of the present invention discover that the engine operating point of the best efficiency is not always given simply as the previously-noted intersection point P0, owing to various efficiencies, namely an engine efficiency, a motor/generator efficiency, and a power-transmission efficiency of the power-transmission mechanism (5, 6, 7). That is to say, the engine operating point of the best efficiency varies depending on the ratio of the required-driving-torque dependent power to the required-electric-energy-generation dependent power, as well as the sum of the required-driving-torque dependent power and the required-electric-energy-generation dependent power. The higher the ratio of the required-driving-torque dependent power to the required-electric-energy-generation dependent power, the engine operating point of the best efficiency tends to change from the intersection point P0 toward the point P1. In other words, the optimum engine operating point of the best efficiency slightly shifts from the intersection point P0 toward the point P1 in a direction enhancing a power-generation efficiency of the motor/generator, while increasing the engine speed Ne (that is, with the slight reduction in the engine output torque). Conversely, the higher the ratio of the required-electric-energy-generation dependent power to the required-driving-torque dependent power, the optimum engine operating point of the best efficiency tends to change from the intersection point P0 toward the point P2. In this case, the engine operating point of the best efficiency slightly shifts from the intersection point P0 toward the point P2 in a direction enhancing a power-transmission efficiency of the power-transmission mechanism including at least the CVT 5, while reducing the engine speed Ne (that is, with the slight increase in the engine output torque). From the viewpoint discussed above, in the driving force control system of the embodiment, when the clutch 3 is engaged, a desired engine operating point of the best efficiency (the lowest fuel consumption) must be determined in due consideration of all of the engine efficiency, the motor/generator efficiency, and the power-transmission efficiency of the power-transmission mechanism (5, 6, 7). On the other hand, when the clutch 3 is disengaged, a desired motor/generator operating point of the best efficiency (the lowest electric-power consumption) must be determined in due consideration of both the motor/generator efficiency and the power-transmission efficiency of the power-transmission mechanism (5, 6, 7).

Figure 4:
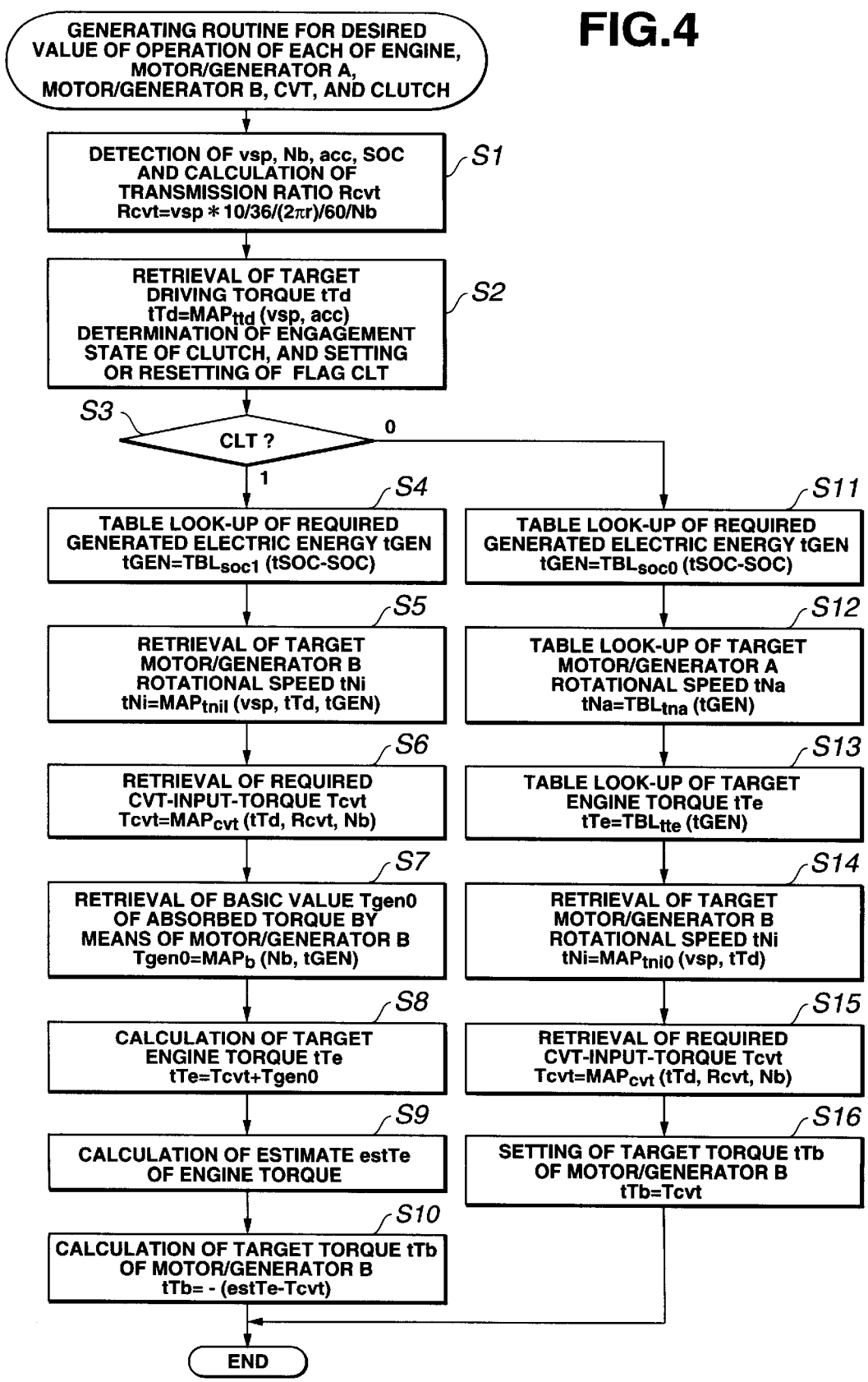
FIG. 4 is a flow chart illustrating a generating routine for desired values of operations of each of the engine 2, the motor/generator 1, the motor/generator 4, the continuously variable transmission (CVT) 5, and the clutch 3.

Referring now to FIG. 4, there is shown the generating routine for the desired values (tTd, tTe, tGEN, tNi, tNa, tTb, Rcvt, Tcvt) of operations of each of the engine 2, the motor/generator A (the motor/generator 1), the motor/generator B (the motor/generator 4), the CVT 5, and the clutch 3. The generating routine shown in FIG. 4 is executed by means of the processor of the microcomputer constructing the ECU 16, as time-triggered interrupt routines to be triggered every predetermined time intervals.

In step S1, first of all, the vehicle speed vsp, the motor/generator B rotational speed Nb, the accelerator opening acc, and the main-battery SOC are read out. Then, the actual transmission ratio Rcvt of the CVT 5 is arithmetically calculated from the following expression.

$$Rcvt = vsp \times 10/36/(2\pi r)/60/Nb$$

where r denotes an effective radius of the drive wheel 8.

Figure 5:
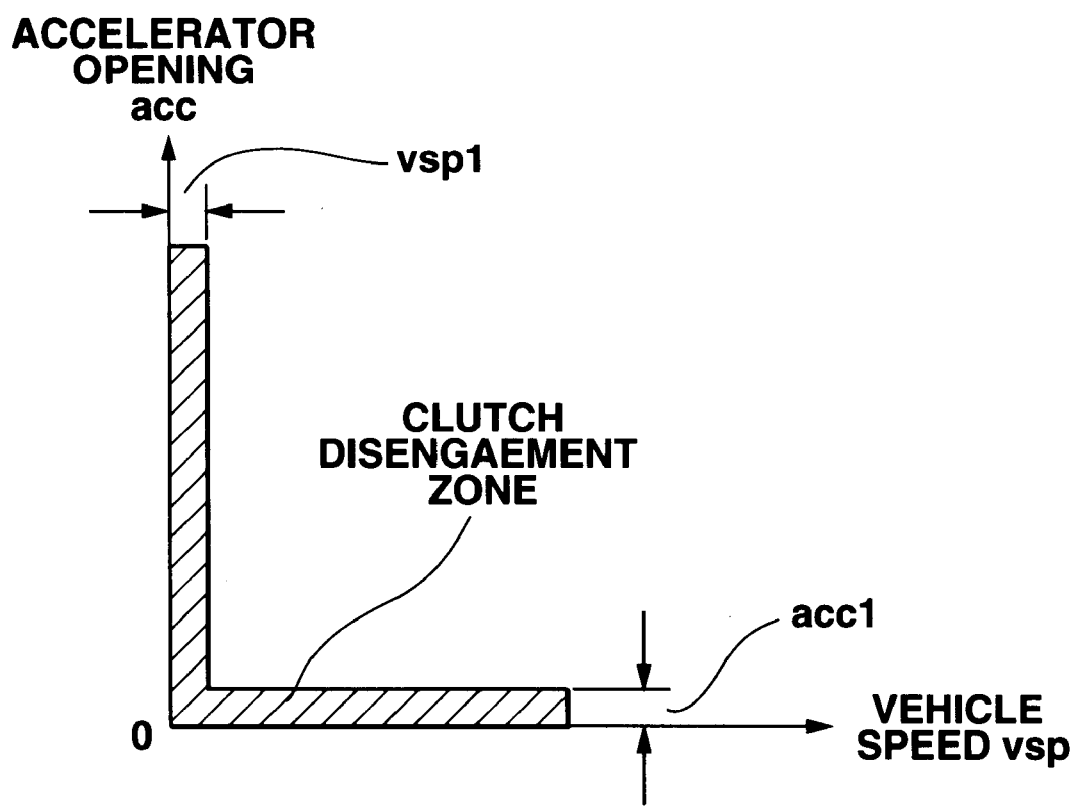
FIG. 5 is a preprogrammed clutch-engagement-zone decision map representative of the relationship among a clutch engagement zone, a clutch disengagement zone, the vehicle speed vsp, and the accelerator opening acc.

In step S2, a target driving torque tTd is retrieved from a predetermined or preprogrammed characteristic map MAPttd showing how the target driving torque tTd has to be varied relative to both the vehicle speed vsp and the accelerator opening acc. This map-retrieval is represented by the equation $tTd = MAP_{ttd}(vsp, acc)$. In order to enhance the driveability of the parallel hybrid vehicle having the driving force control system of the embodiment, the other factors, that is, dynamic compensation such as time-rate limitation and a first-order-lag element, may be made to the target driving torque tTd map-retrieved. Also, at step S2, the presence or absence of the driver's requirement for engagement of the clutch 3 is determined depending on the vehicle speed vsp and the accelerator opening acc. When the processor of the ECU 16 determines that the driver's request for engagement of the clutch 3 is present, a clutch-engagement request flag CLT is set at "1". When the processor of the ECU 16 determines that there is no driver's request for clutch engagement, the clutch-engagement request flag CLT is reset to "0". FIG. 5 shows one example of the preprogrammed clutch-engagement-zone/clutch-disengagement zone decision map. In FIG. 5, the hatched zone indicates the clutch disengagement zone. On the other hand, the unhatched zone indicates the clutch engagement zone. If a certain point plotted on the map relative to the latest up-to-date informational data signal indicative of the vehicle speed vsp and the latest up-to-date informational data signal indicative of the accelerator opening acc is included in the hatched zone, the ECU 16 generates a command signal to the clutch 3 so that the clutch is released (disengaged). Conversely, when a certain point plotted on the map relative to the latest up-to-date informational data signal indicative of the vehicle speed vsp and the latest up-to-date informational data signal indicative of the accelerator opening acc is included in the unhatched zone (the clutch engagement zone), the ECU 16 generates a command signal to the clutch 3 so that the clutch is engaged. In FIG. 5, acc1 denotes a basic value of the accelerator opening (the degree of depression of the accelerator), whereas vsp1 denotes a vehicle-speed threshold value. The accelerator-opening basic value acc1 is used to determine or check whether the accelerator pedal is conditioned in its released state or in its depressed state. The accelerator-opening basic value acc1 is set at a predetermined low value which is a minimum value substantially corresponding to a substantially released position of the accelerator pedal. Under a particular condition where the actual accelerator opening acc exceeds the predetermined accelerator-opening basic value acc1 and thus the accelerator pedal is conditioned in the depressed state, if the vehicle speed vsp detected by the vehicle speed sensor 22 becomes less than the vehicle-speed threshold value vsp1, the operating mode of the clutch 3 is changed from the engaged state to the disengaged state. Even when the vehicle speed vsp exceeds the predetermined threshold value vsp1, if the accelerator opening acc is below the predetermined basic value acc1 and thus the ECU 16 determines that the accelerator pedal is released, the clutch 3 is kept disengaged. This is because the released state of the accelerator pedal means that there is no driver's request for engine output power. Therefore, if two necessary conditions (acc≦acc1 and vsp>vsp1) are satisfied simultaneously, the clutch 3 is released (disengaged), and then the vehicle decelerates by means of only the motor/generator B operating in the regenerative braking mode, for the purpose of increasing the rate of recovery of the deceleration energy (kinetic energy).

In step S3, a test is made to determine whether the clutch-engagement request flag CLT is set or reset. When the flag CLT is set (CLT=1), the routine flows to step S4. When the flag CLT is reset (CLT=0), step S11 occurs. In lieu of the use of the clutch-engagement request flag CLT based on both the vehicle speed vsp and the accelerator opening acc, an engaged/disengaged state of the clutch 3 may be actually detected. In this case, if the clutch 3 is engaged actually, the routine proceeds to step S4. If the clutch is disengaged actually, the routine proceeds to step S11. When the clutch-engagement request flag CLT is set or during the clutch engaged state, the input shaft of the motor/generator 4 is connected directly to the output shaft of the engine 2 with the speed ratio of 1, and thus the engine speed is equal to the rotational speed of the motor/generator B. For the reasons set forth above, when the clutch-engagement request flag CLT is set or during the clutch engaged state, the target engine speed can be regarded as a value identical to the target motor/generator B rotational speed tNi. In the presence of the clutch engagement request (CLT=1) or during the clutch engaged state, in step S4, a target generated electric energy tGEN for the motor/generator B is looked up in a predetermined or preprogrammed look-up table $TBL_{soc1}$ (tSOC–SOC), so as to the target generated electric energy tGEN corresponding to the difference (tSOC–SOC) between a desired state of charge tSOC of the main battery 15 and the actual state of charge SOC. This table look-up operation is represented by the equation tGEN=$TBL_{soc1}$(tSOC–SOC). The preprogrammed look-up table $TBL_{soc1}$(tSOC–SOC) is designed so that the target generated electric energy TGEN is a monotone increasing function with respect to the difference (tSOC–SOC) between the desired state-of-charge TSOC and the actual state-of-charge SOC, in order to accurately adjust the actual state-of-charge SOC of the main battery 15 toward the desired state-of-charge tSOC. Thereafter, in step S5, a target motor/generator B rotational speed (=a target engine speed) tNi is map-retrieved on the basis of the target generated electric energy tGEN, the vehicle speed vsp, and the target driving torque tTd, from a predetermined or preprogrammed triaxial characteristic map $MAP_{mi1}$ showing how the target motor/generator B rotational speed tNi has to be varied relative to all of the target generated electric energy tGEN, the vehicle speed vsp, and the target driving torque tTd. The triaxial map-retrieval is represented by the equation tNi=$MAP_{mi1}$(vsp, tTd, tGEN). The triaxial map $MAP_{mi1}$ is a preprogrammed characteristic map relating to the target motor/generator B rotational speed (=the target engine speed) tNi at which it is possible to attain or realize the target generated electric energy tGEN, the vehicle speed vsp, and the target driving torque tTd at the best engine operating point (the lowest fuel consumption), while accounting for all of the engine efficiency data, the motor/generator B efficiency data, and the power-transmission efficiency data of the power-transmission mechanism including the CVT 5, the reduction gear 6, and the differential gear 7. Thus, the engine operating point of the best efficiency (the lowest fuel consumption), suitable for all of the vehicle speed, the driver's required driving torque and the required generated electric energy, can be properly determined. Additionally, regardless of variations in the ratio of the required-driving-torque dependent power to the required-electric-energy-generation dependent power, the engine 2 can operate always at the engine operating point of the best engine efficiency (the lowest fuel consumption). Also, the target engine speed (=the target motor/generator B rotational speed) tNi is computed (actually map-retrieved) in due consideration of all of the engine efficiency data, the motor/generator B efficiency data, and the power-transmission efficiency data of the power-transmission mechanism (including the power-transmission components 5, 6, and 7), and thus it is possible to accurately realize the required-driving-torque dependent power for the driver's required driving torque and the required-electric-energy-generation dependent power for the required generated electric energy. Additionally, in computing the target engine speed tNi, the preprogrammed triaxial characteristic map $MAP_{mi1}$ (relating to the target engine speed tNi) capable of realizing all of the vehicle speed vsp, the target driving torque tTd, and the target generated electric energy tGEN, at the best engine efficiency (the lowest fuel consumption), is used. As a result of this, the computation of the target engine speed tNi (the engine operating point of the lowest fuel consumption) can be easily and rapidly executed and attained by means of the microcomputer.

In step S6, a required input torque Tcvt of the CVT 5 is retrieved from a preprogrammed or predetermined characteristic map $MAP_{cvt}$ showing how the required CVT input torque Tcvt has to be varied relative to the target driving torque tTd, the actual transmission ratio Rcvt, and the motor/generator B rotational speed Nb (the engine speed Ne). The characteristic map $MAP_{cvt}$ is designed to properly retrieve the required CVT input torque Tcvt correlated to all of the target driving torque tTd, the actual transmission ratio Rcvt, and the motor/generator B rotational speed Nb, in order to compensate for torque loss in the power-transmission mechanism including the CVT 5, the reduction gear 6, and the differential 7, and in due consideration of the power-transmission efficiency of the power-transmission mechanism. The map retrieval is represented by the equation Tcvt=$MAP_{cvt}$(tTd, Rcvt, Nb). As is generally known, during the speed-change control of the CVT 5, the rotational inertia (inertial force) of the engine 2 and the rotational inertia (inertial force) of the motor/generator B have an influence on power transmission of the power-transmission mechanism (5, 6, 7). Therefore, it is preferable that a rotational-inertia correction torque value Tint may be further added to the map-retrieved value $MAP_{cvt}(tTd, Rcvt, Nb)$, and then the total value $\{MAP_{cvt}(tTd, Rcvt, Nb)+Tint\}$ may be set as the required CVT input torque Tcvt. In this case, the required input torque Tcvt of the CVT 5 can be necessarily set at a preferable target driving torque value (tTd), accounting for the rotational inertia of the engine 2 and the rotational inertia of the motor/generator B as well as the torque-transmission loss of the power-transmission mechanism (5, 6, 7). The rotational-inertia correction torque value Tint is arithmetically calculated by the following expression.

$$Tint=Ipp \times Rf \times \omega d \times (dRcvt/dt)$$

where Ipp denotes a mass moment of inertia with respect to the axis of the input shaft of the CVT 5, Rf denotes a final reduction gear ratio, ωd denotes an angular velocity of the driving shaft, and Rcvt denotes the transmission ratio of the CVT 5.

In step S7, a basic value Tgen0 of torque to be absorbed by the motor/generator B is retrieved from a preprogrammed or predetermined characteristic map $MAP_b$ showing how the absorbed-torque basic value Tgen0 has to be varied relative to an arbitrary motor/generator B rotational speed Nb and the target generated electric energy tGEN. The map retrieval is represented by the equation $Tgen0=MAP_b(Nb, tGEN)$. As per the map $MAP_b(Nb, tGEN)$, the basic value Tgen0 of torque to be absorbed by the motor/generator B is preset or prestored in the memory in the form of map data so that the target generated electric energy tGEN is realized at the arbitrary motor/generator B rotational speed Nb. Actually, the absorbed-torque basic value Tgen0 is properly related to both the motor/generator B rotational speed Nb and the target generated electric energy tGEN, accounting for the electric-power-generation efficiency of the motor/generator B.

In step S8, for the purpose of providing both the target driving torque tTd and the target generated electric energy tGEN basically by means of the engine 2, a target engine torque tTe is arithmetically calculated as the sum of the required CVT input torque Tcvt and the absorbed-torque basic value Tgen0, from the following expression.

$$tTe=Tcvt+Tgen0$$

Instep S9, an estimate estTe of engine output torque is computed by either one of the following three ways.

(i) According to one way, the engine-torque estimate estTe can be map-retrieved on the basis of both the engine speed Ne and the throttle opening $\theta_{th}$ of the engine 2, from a preprogrammed map showing how the engine-torque estimate estTe has to be varied relative to the engine speed Ne and the throttle opening $\theta_{th}$.

(ii) According to another way, the engine-torque estimate estTe can be estimated from an in-cylinder pressure (or a fuel pressure) in the combustion chamber of the engine 2. In this case, an in-cylinder pressure sensor or a fuel-pressure sensor must be provided in the engine 2.

(iii) According to another way, the engine-torque estimate estTe can be estimated from an intake-air quantity entering the engine 2 and the engine speed Ne. For the intake-air quantity measurement, an intake-air quantity sensor such as an air flow meter, usually mounted on the engine 2, can be used.

Subsequently to step S9, at step S10, a target torque tTb of the motor/generator B is arithmetically calculated by the following expression, and then the ECU 16 controls the motor/generator B on the basis of the calculated target torque value tTb, such that the actual driving force (the actual driving torque) is adjusted to the target driving force (the target driving torque).

$$tTb=-(estTe-Tcvt)$$

As can be appreciated from the above-mentioned expression $tTb=-(estTe-Tcvt)$, if necessary, the parallel hybrid system executes the motor-assist mode (in case of the positive tTb) where the motor/generator B supplies a deficiency of torque produced by the engine 2 with respect to the required CVT input torque Tcvt so that the actual driving torque is adjusted to the target driving torque, or executes the regenerative mode (in the negative tTb) where the motor/generator B regenerates electricity to absorb excessive torque produced by the engine. As set out above, when the clutch-engagement request flag CLT is set (CLT=1) or during the clutch engaged state, the engine output shaft torque T1, that is, the required CVT input torque Tcvt of the CVT 5 is computed in such a manner as to realize the target driving torque tTd while compensating for the power-transmission loss in the power-transmission mechanism (5, 6, 7) in due consideration of the engine speed (the motor/generator B rotational speed Nb), the vehicle speed vsp, and the target driving torque tTd. Additionally, an equivalent engine output shaft torque T2, that is, the basic value Tgen0 of torque to be absorbed by the motor/generator B is computed, in such a manner as to realize the target generated electric energy tGEN, while compensating for energy loss in the motor/generator B on the basis of the motor/generator B rotational speed Nb and the target generated electric energy tGEN. After computation of these necessary data Tcvt and Tgen0, the sum (Tcvt+Tgen0) of the target CVT input torque Tcvt and the absorbed-torque basic value Tgen0 is set at the target engine torque tTe. That is, tTe=Tcvt+Tgen0. The torque value $\{-(estTe-Tcvt)\}$ obtained by subtracting the engine-torque estimate estTe from the required CVT input torque Tcvt is set as the target torque value tTb of the motor/generator B. With the previously-noted comparatively easy and simple computing actions performed within the CPU of the ECU 16, namely arithmetic calculations (see steps S1, S8 and S10), map-retrieval operations (see steps S2, S5, S6 and S7), and table look-up operation (see step S4), it is possible to constantly accurately realize the target driving torque tTd, and also to accurately steadily realize the target generated electric energy tGEN.

In contrast to the above, when the clutch-engagement request flag CLT is reset or during the clutch disengaged state, a series of steps S11–S16 are executed in that order. In the absence of the clutch engagement request (that is, CLT=0) or during the clutch disengaged state, the engine speed Ne varies independently of the motor/generator B rotational speed Nb. In step S11, a target generated electric energy tGEN for the motor/generator A is looked up in a predetermined or preprogrammed look-up table $TBL_{soc0}$ (tSOC–SOC), so as to produce the target generated electric energy tGEN corresponding to the difference (tSOC–SOC) between a desired state-of-charge tSOC of the main battery 15 and the actual state-of-charge SOC. The table look-up is represented by the equation $tGEN=TBL_{soc0}(tSOC-SOC)$. The preprogrammed look-up table $TBL_{soc0}(tSOC-SOC)$ is designed, such that the target generated electric energy tGEN is a monotone increasing function with respect to the difference (tSOC–SOC) between the desired state-of-charge tSOC and the actual state-of-charge SOC, in order to accurately adjust the actual state-of-charge SOC of the main battery 15 to the desired state-of-charge tSOC. The table $TBL_{soc0}$ used to compute the target generated electric energy tGEN for the motor/generator A, has a characteristic different from the table $TBL_{soc1}$ used to compute the target generated electric energy tGEN for the motor/generator B. In step S12, a target motor/generator A rotational speed tNa is looked up on the basis of the target generated electric energy tGEN, from a predetermined or preprogrammed look-up table $TBL_{tna}$ showing how the target motor/generator A rotational speed tNa has to be varied relative to the target generated electric energy tGEN. The table look-up is represented by the equation tNa=$TBL_{tna}$(tGEN). In step S13, a target engine torque tTe is looked up on the basis of the target generated electric energy tGEN, from a predetermined or preprogrammed look-up table $TBL_{tte}$ showing how the target engine torque tTe has to be varied relative to the target generated electric energy tGEN. The table look-up is represented by the equation tTe=$TBL_{tte}$(tGEN). In step S14, a target motor/generator B rotational speed tNi is map-retrieved on the basis of the vehicle speed vsp and the target driving torque tTd, from a predetermined or preprogrammed biaxial characteristic map $MAP_{mi0}$ showing how the target motor/generator B rotational speed tNi has to be varied relative to both the vehicle speed vsp and the target driving torque tTd. The biaxial map-retrieval is represented by the equation tNi=$MAP_{mi0}$(vsp, tTd). The biaxial map $MAP_{mi0}$ is a preprogrammed characteristic map relating to the target motor/generator B rotational speed tNi at which it is possible to attain or realize both the vehicle speed vsp and the target driving torque tTd at the best motor/generator B operating point (the lowest electric power consumption), while accounting for both the motor/generator B output efficiency data, and the power-transmission efficiency data of the power-transmission mechanism including the CVT 5, the reduction gear 6, and the differential gear 7. Thus, the motor/generator B operating point of the best output efficiency (the lowest electric power consumption), suitable for both the vehicle speed and the driver's required driving torque, can be determined by virtue of the biaxial map $MAP_{mi0}$. Also, the target motor/generator B rotational speed tNi is computed (actually map-retrieved) in due consideration of both the motor/generator B efficiency data and the power-transmission efficiency data of the power-transmission mechanism (including the power-transmission components 5, 6, 7), and thus it is possible to accurately realize the required-driving-torque dependent power for the driver's required driving torque. In addition, in computing the target motor/generator B rotational speed tNi, the preprogrammed biaxial characteristic map $MAP_{mi0}$ (relating to the target motor/generator B rotational speed tNi) capable of realizing both the vehicle speed vsp and the target driving torque tTd, at the best motor/generator B efficiency (the lowest electric power consumption), is used. As a result of this, the computation for the target motor/generator B rotational speed tNi (the motor/generator B operating point of the lowest electric power consumption) can be easily and rapidly executed and attained by means of the microcomputer. In step S15, a required input torque Tcvt of the CVT 5 is retrieved from a preprogrammed or predetermined characteristic map $MAP_{cvt}$ showing how the required CVT input torque Tcvt has to be varied relative to the target driving torque tTd, the actual transmission ratio Rcvt, and the motor/generator B rotational speed Nb. The characteristic map $MAP_{cvt}$ is designed to properly retrieve the required CVT input torque Tcvt correlated to all of the target driving torque tTd, the actual transmission ratio Rcvt, and the motor/generator B rotational speed Nb, in order to compensate for torque loss in the power-transmission mechanism including the CVT 5, the reduction gear 6, and the differential 7, and in due consideration of the power-transmission efficiency of the power-transmission mechanism. The map retrieval is represented by the equation Tcvt=$MAP_{cvt}$(tTd, Rcvt, Nb). The map-retrieval executed in step S15 is identical to that executed in step S6. Thereafter, at step S16, the required CVT input torque Tcvt is set as the target motor/generator B torque tTb needed to realize the target driving force. That is to say, the target motor/generator B torque tTb is represented by the expression tTb=Tcvt.

As discussed above, when the clutch-engagement request flag CLT is reset (CLT=0) or during the clutch disengaged state, the required CVT input torque Tcvt is simply set at the target motor/generator B torque tTb, in such a manner as to realize the target driving torque tTd while compensating for the power-transmission loss in the power-transmission mechanism (5, 6, 7) in due consideration of the motor/generator B rotational speed Nb, the vehicle speed vsp, and the target driving torque tTd. With the previously-noted comparatively easy and simple computations performed within the CPU of the ECU 16, containing arithmetic calculation (see step S16), map-retrieval operations (see steps S14 and S15), and table look-up operations (see steps S11, S12 and S13), it is possible to constantly accurately realize the target driving torque tTd. In this manner, after the desired values (tTd, tTe, tGEN, tNi, tNa, tTb, Rcvt, Tcvt) of operations of each of the engine 2, the motor/generator A, the motor/generator B, the CVT 5 and the clutch 3 are computed, the ECU 16 controls, on the basis of the results of computations, the transmission ratio (Rcvt) of the CVT 5, so that the input shaft rotational speed of the CVT 5 is adjusted to the target motor/generator B rotational speed tNi. Also, the ECU 16 controls the clutch 3 to perform switching between the engaged and disengaged states, depending on whether the clutch-engagement request flag CLT is set or reset. Although it is not clearly shown in the drawings, the processor of the ECU 16 also retrieves or looks up a desired throttle opening on the basis of both the engine speed Ne and the target engine torque tTe, from a preprogrammed map or a preprogrammed look-up table. Thereafter, in order to attain the target engine torque tTe, the ECU 16 controls the throttle valve of the electronically-controlled throttle, so that the actual throttle opening $\theta_{th}$ detected by the throttle sensor 26 is adjusted toward the desired throttle opening based on the engine speed Ne and the target engine torque tTe. On the other hand, the target torque tTb of the motor/generator B is attained or realized by adjusting the three-phase alternating current of the inverter 12 which serves as a driving circuit of the motor/generator B. Moreover, when the clutch-engagement request flag CLT is reset (CLT=0), or when the clutch 3 is actually released (disengaged), the motor/generator A is feedback-controlled in order to be able to maintain the actual rotational speed of the motor/generator A at the calculated target motor/generator A rotational speed tNa. It is more preferable that proportional-plus-integral (PI) control in which the control signal from the ECU is linear combination of the error signal and its integral, is used as the feedback control for the motor/generator A rotational speed. Conversely, when the clutch-engagement request flag CLT is set (CLT=1), or when the clutch 3 is actually engaged, the ECU 16 controls the motor/generator A so that a value of torque produced by the motor/generator A is adjusted to "0".

As set forth above, according to the desired-values generating routine shown in FIG. 4, in the presence of the clutch-engagement request or during the clutch engaged state, it is possible to compute or calculate the target engine speed tNi required to realize all of the vehicle speed vsp, the target driving torque tTd, and the target generated electric energy tGEN at the lowest fuel consumption rate (the best engine efficiency), accounting for all of the engine efficiency data, the motor/generator B efficiency data, and the power-transmission efficiency data of the power-transmission mechanism (5, 6, 7). In the absence of the clutch-engagement request or during the clutch disengaged state, it is possible to compute or calculate the target motor/generator B rotational speed tNi required to realize both the vehicle speed vsp and the target driving torque tTd at the lowest electric power consumption rate (the best motor/generator B efficiency), accounting for both the motor/generator B efficiency data and the power-transmission efficiency data of the power-transmission mechanism (5, 6, 7). Additionally, in the absence of the clutch-engagement request or during the clutch disengaged state, the transmission ratio of the CVT 5 is controlled so that the actual rotational speed of the motor/generator B is adjusted to the target motor/generator B rotational speed tNi. Conversely, in the presence of the clutch-engagement request or during the clutch engaged state, the transmission ratio of the CVT 5 is controlled so that the actual engine speed is adjusted to the target engine speed tNi. As exemplified, when the driving force control system of the embodiment is applied to a parallel hybrid vehicle employing a parallel hybrid system, in which a clutch 3 is provided between the engine 2 and the motor/generator B and a driving force (a driving torque) of at least one of the engine 2 and the motor/generator B can be transmitted through the power-transmission mechanism (5, 6 and 7) to the drive wheels (8, 8), it is possible to determine the best engine operating point suitable for all control factors, namely the vehicle speed vsp, the driver's required driving torque, and the required generated electric energy, in the presence of the clutch-engagement request or during the clutch engaged state. Also, it is possible to operate the engine 2 at the engine operating point of the best engine efficiency (i.e., the lowest fuel consumption rate), even when the ratio of the required-driving-torque dependent power to the required-electric-energy-generation dependent power is varying. Furthermore, the target engine speed (the target motor/generator B rotational speed tNi) is computed or calculated in due consideration of all of the engine efficiency data, the motor/generator B efficiency data, and the power-transmission efficiency data of the power-transmission mechanism. Thus, it is possible to accurately realize the required-driving-torque dependent power (the time rate of doing work for the driver's required driving torque) as well as the required-electric-energy-generation dependent power (the time rate of doing work for the required generated electric energy). On the other hand, in the absence of clutch-engagement request or during the clutch disengaged state, the driving force control system of the embodiment computes or calculates the target motor/generator B rotational speed tNi required to realize both the vehicle speed vsp and the target driving torque tTd at the lowest electric power consumption rate (the best motor/generator B operating point), in due consideration of the motor/generator B efficiency data and the power-transmission efficiency data of the power-transmission mechanism (5, 6, 7). Thus, it is possible to determine the best motor/generator B operating point suitable for the vehicle speed vsp and the driver's required driving torque. Also, the motor/generator B rotational speed is computed or calculated in due consideration of both the motor/generator B efficiency data and the power-transmission efficiency data of the power-transmission mechanism (5, 6, 7), and thus it is possible to accurately realize the required-driving-torque dependent power (the time rate of doing work for the driver's required driving torque). Furthermore, according to the system of the embodiment, the desired operating points of the engine 2, the motor/generator B and the CVT 5 can be suitably rapidly changed or switched, depending upon the driver's request for clutch engagement (the setting of the clutch-engagement request flag CLT) or the driver's request for clutch disengagement (the resetting of the clutch-engagement request flag CLT). In this manner, the shifting of operating points of the engine 2, the motor/generator B and the CVT 5, can be rapidly timely accomplished concurrently in response to the engaging/disengaging actions of the clutch 3. This suppresses or avoids the deficiency of driving force (driving torque), even during the shifting period of operating points of the engine 2, the motor/generator B, and/or the CVT 5.

Figure 6:
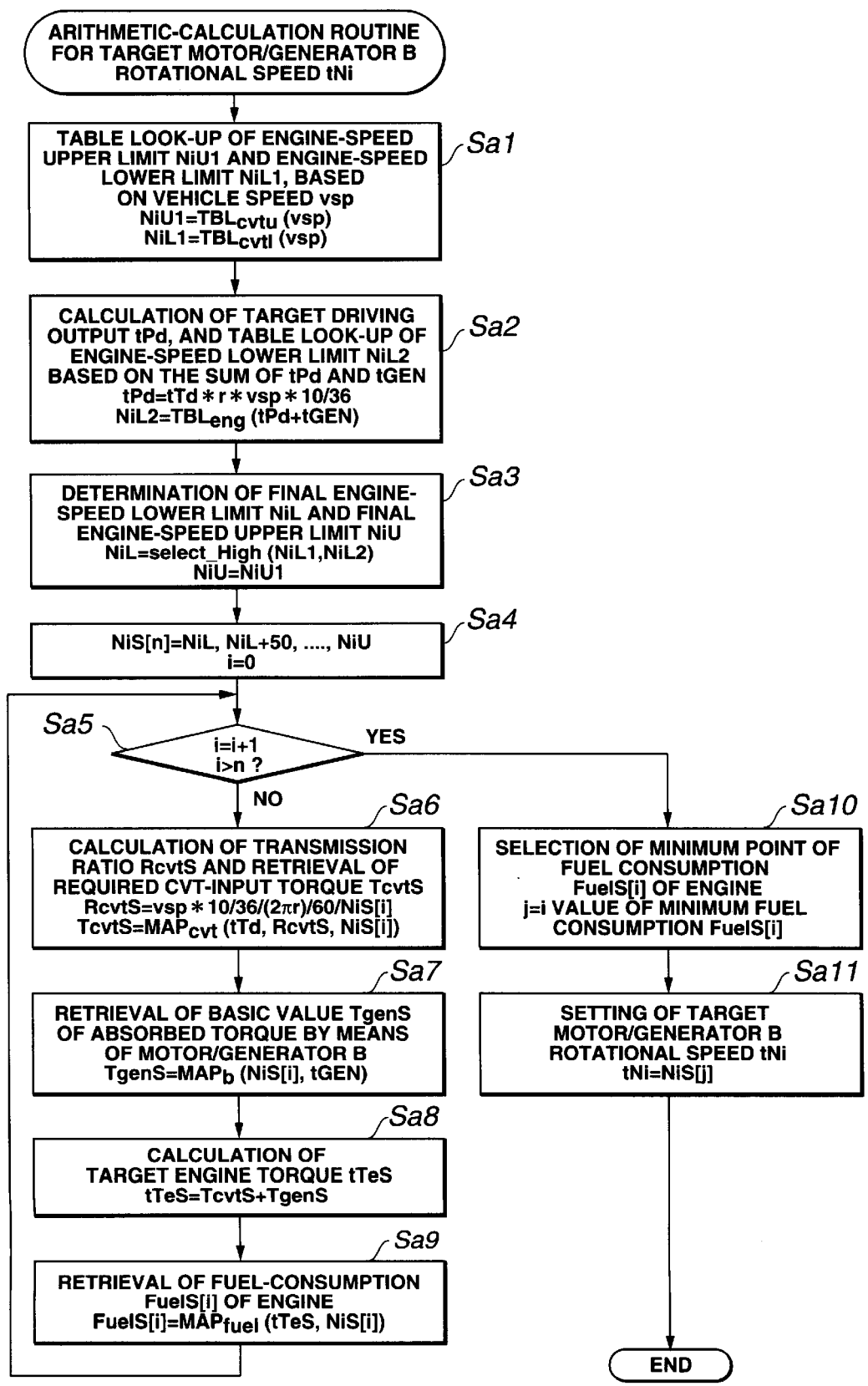
FIG. 6 is a flow chart illustrating a first modification for a target motor/generator B rotational speed (target engine speed tNi) arithmetic-calculation routine.

Referring now to FIG. 6, there is shown the first modification for the target motor/generator B rotational speed (tNi) arithmetic calculation executed through steps S1–S5 (see FIG. 4) when the clutch-engagement request flag CLT is set or during the clutch engaged state.

Figure 7:
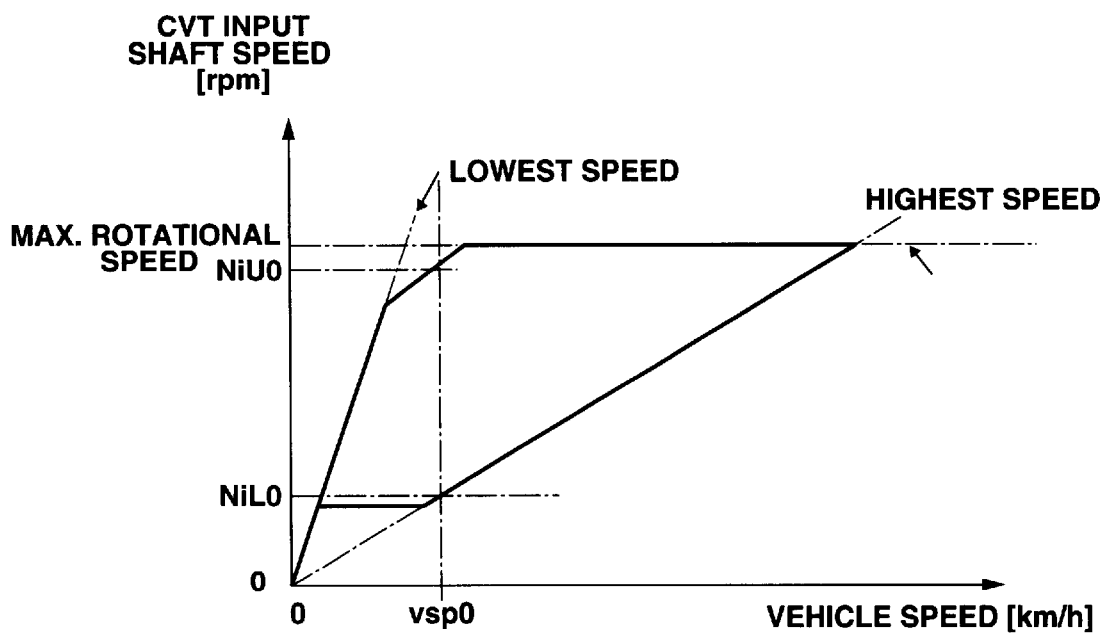
FIG. 7 shows an example of a characteristic map representative of a predetermined speed-change pattern based on the transmission input shaft speed and the transmission output shaft speed (the vehicle speed vsp), and showing how the engine speed has to be varied within certain limits (within a preprogrammed speed-change permission zone defined by the lowest speed line and the highest speed line).
Figure 8:
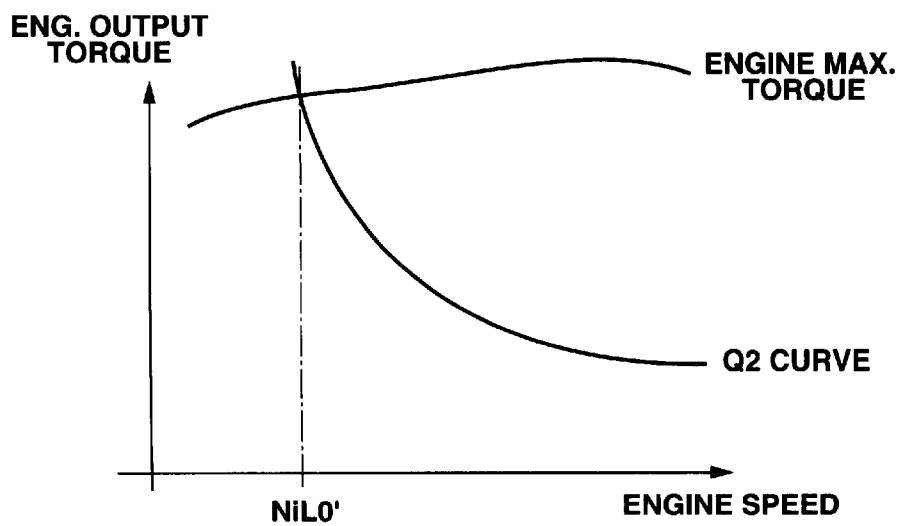
FIG. 8 is an explanatory view explaining a way of determination of the engine-speed lower limit NiL0' relative to a mechanical power Q2 defined as the sum (tPd+tGEN) of a target power output tPd and a target generated electric energy tGEN.
Figure 9:
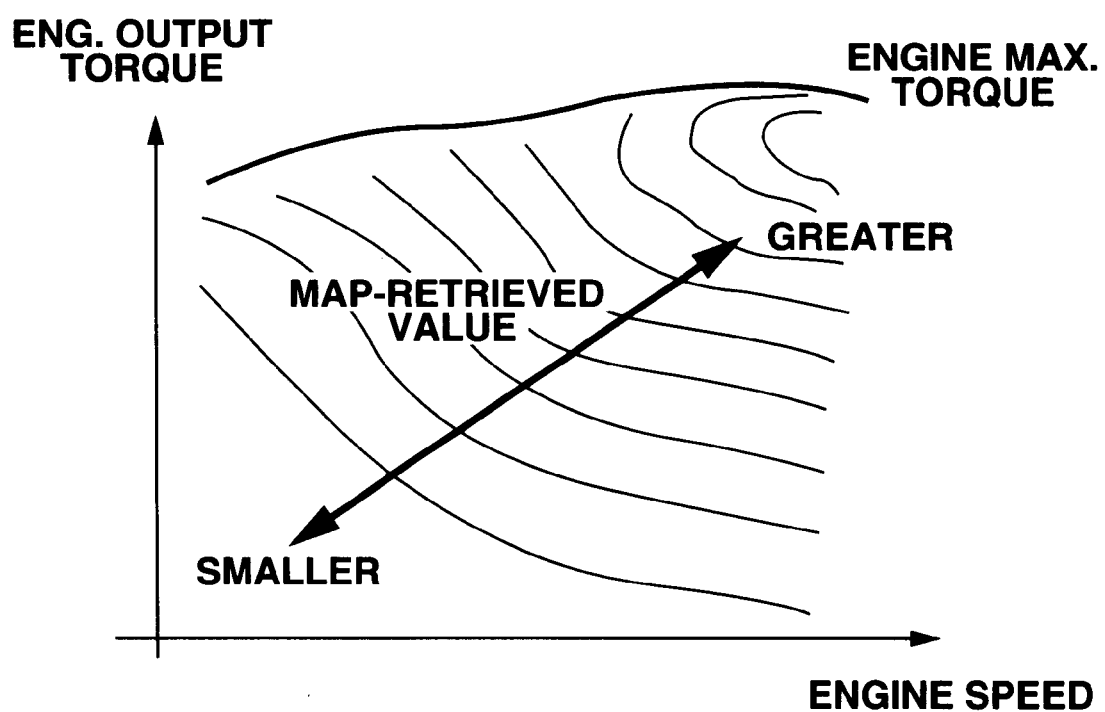
FIG. 9 is a fuel consumption map illustrating the relationship among the engine speed (NiS[i]), the engine output torque (tTeS), and the fuel consumption or the fuel consumption rate.

As may be appreciated from a characteristic map of FIG. 7 showing the speed-change control characteristics for the CVT 5, upper and lower limits of the engine speed, both varying depending on the vehicle speed vsp, are limited owing to the structural limits of the CVT 5. In FIG. 7, the axis of ordinate indicates a CVT input shaft speed, whereas the axis of abscissa indicates the vehicle speed vsp corresponding to a CVT output shaft speed. Suppose that the vehicle speed (vsp) of the axis of abscissa is identical to the transmission output shaft speed, since the transmission output shaft speed is generally regarded as the vehicle speed (vsp) or the vehicular body speed. In the map shown in FIG. 7, the upper polygonal line indicates the maximum transmission ratio line (the lowest speed line), whereas the lower polygonal line indicates the minimum transmission ratio line (the highest speed line). The right-hand side moderately inclined part of the lower polygonal line means a predetermined lower limit (the minimum speed ratio) of the speed-change ratio, whereas the left-hand side steeply inclined part of the upper polygonal line means a predetermined upper limit (the maximum speed ratio) of the speed-change ratio. The intermediate zone, bordered between the upper and lower polygonal lines, corresponds to a usual speed-change control enable zone.

Accounting for the structural limits of the CVT 5, first of all, in step Sa1, an engine-speed upper limit NiU1 and an engine-speed lower limit NiL1 are looked-up from a preprogrammed or predetermined look-up table $TBL_{cvtu}$ showing how the upper limit NiU1 has to be varied relative to the vehicle speed vsp and a preprogrammed or predetermined look-up table $TBL_{cvtl}$ showing how the lower limit NiL1 has to be varied relative to the vehicle speed vsp. These table look-up operations are represented by the equations NiU1= $TBL_{cvtu}$(vsp) and NiL1=$TBL_{cvtl}$(vsp). For instance, assuming that the input informational data signal value indicative of vehicle speed vsp is a certain vehicle speed value vsp0, the engine-speed upper limit NiU0 and the engine-speed lower limit NiL0 can be given as NiU0=$TBL_{cvtu}$(vsp0) and NiL0=$TBL_{cvtl}$(vsp0), respectively. As discussed above, in the driving force control system of the embodiment, in arithmetically calculating the target engine speed and the target motor/generator B rotational speed, the engine speed range used to compute the fuel consumption FuelS and the motor/generator B rotational speed range used to compute the electric power consumption ElecS is set within a rotational speed range which can be produced actually by the CVT 5. This effectively eliminates wasteful arithmetic calculations, for example arithmetic operations for the fuel consumption FuelS or the electric power consumption ElecS with respect to speeds above the predetermined upper limit or below the predetermined lower limit. This can reduce the load to arithmetic calculations within the microcomputer, thus ensuring quick computation for the target engine speed or the target motor/generator B rotational speed.

In step Sa2, a target power output tPd, required to realize the target driving torque tTd, is arithmetically calculated from the following expression.

$$tPd = tTd \times r \times vsp \times 10/36$$

where r denotes an effective radius of the driving wheel 8. In the same step Sa2, the engine-speed lower limit NiL2, needed to realize the mechanical power (that is, the sum (tPd+tGEN) of a time rate of doing work for the target output power tPd and a time rate of doing work for the target generated electric energy tGEN), is then looked up from a preprogrammed or predetermined look-up table $TBL_{eng}$. The table look-up is represented by the equation NiL2=$TBL_{eng}$(tPd+tGEN). As is generally known, there are various power losses, such as energy loss (power-generation loss) in the motor/generator B and energy loss in the power-transmission mechanism including the CVT 5, the reduction gear 6, and the differential 7. Thus, when the clutch-engagement request flag CLT is set or during the clutch engaged state, a total output (A+B) corresponding to both the mechanical power (the sum A of a time rate of doing work for the target output power tPd and a time rate of doing work for the target generated electric energy tGEN), and the previously-noted energy losses B must be produced by the engine 2. Such an engine operating point must be necessarily set at an operating point having an engine speed greater than the engine-speed lower limit NiL2. Assuming that the mechanical power (the sum (tPd+tGEN) of the time rate of doing work for the target output power tPd and the time rate of doing work for the target generated electric energy tGEN) is a certain mechanical power Q2 [kw], the engine-speed lower limit NiL0' table-looked up from the preprogrammed table $TBL_{eng}$ is represented by the equation NiL0'=$TBL_{eng}$(Q2). In this case, the engine 2 must be operated at engine speed greater than the engine-speed lower limit NiL0'. As explained above, in arithmetically calculating the target engine speed (=the target motor/generator B rotational speed tNi), the engine speed range (the engine speed upper and lower limits NiU1 and NiL1), needed to compute the fuel consumption, are set within a specified speed range in which the mechanical power (the sum (tPd+tGEN) of the time rate of doing work for the target output power tPd and the time rate of doing work for the target generated electric energy tGEN) can be realized by means of the engine 2. This effectively eliminates unreasonable arithmetic calculation for the fuel consumption, for example arithmetic calculations made with respect to engine speeds below the table-looked-up engine-speed lower limit NiL2. This can reduce the load to arithmetic calculations within the microcomputer, thus ensuring quick computation for the target engine speed (=the target motor/generator B rotational speed tNi) when the clutch-engagement request flag CLT is set or during the clutch engaged state.

Through step Sa3, the final engine speed range (that is, the final engine-speed lower limit NiL and the final engine-speed upper limit NiU), needed to compute the fuel consumption FuelS, is determined. The final engine-speed lower limit NiL is determined as the higher one of the two table-looked-up data NiL1 and NiL2, by way of a select-HIGH process NiL=select_High(NiL1, NiL2), whereas the final engine-speed upper limit NiU is set at the table-looked-up data NiU1(=$TBL_{cvtu}$(vsp)).

In step Sa4, as a one dimensional array NiS[n] for engine speeds, needed to compute the fuel consumption FuelS, a series of engine speeds NiS[n], ranging from the previously-noted engine-speed lower limit NiL to the previously-noted engine-speed upper limit NiU and increasing in turn in revolution/minutes by 50 rpm are produced as follows.

$$NiS[n] = NiL, NiL+50, NiL+100, NiL+150, \ldots, NiU$$

where, n denotes the number of elements in the one-dimensional array NiS[n]. At the same time, a value i indicative of the element number in the array NiS[n] is set at an initial value "0". The initialization of the element-number indicative value i is represented by the equation i=0.

In step Sa5, the element-number indicative value i is incremented by "1" (i.e., i=i+1), and then the incremented element-number indicative value i is compared with the number n of elements in the array NiS [n]. When the incremented element-number indicative value i is less than or equal to n (i≦n), step Sa6 occurs. Conversely, when the incremented element-number indicative value i is greater than n (i>n), step Sa10 occurs. In case of i≦n, an engine fuel consumption rate FuelS[i] obtained at a given engine speed NiS[i] corresponding to the element number i in the one-dimensional array NiS[n], is computed or calculated, by way of a series of steps Sa6 to Sa9.

First, in step Sa6, the actual transmission ratio RcvtS for the engine speed NiS[i] is arithmetically calculated from the following expression.

$$RcvtS = vsp \times 10/36/(2\pi r)/60/NiS[i]$$

where r denotes an effective radius of the drive wheel 8. Then, a CVT input torque TcvtS is map-retrieved on the basis of all of the target driving torque tTd, the actual transmission ratio RcvtS, and the engine speed NiS[i], from a preprogrammed characteristic map $MAP_{cvt}$.

$$TcvtS = MAP_{cvt}(tTd, RcvtS, NiS[i])$$

The characteristic map $MAP_{cvt}$(tTd, RcvtS, NiS[i]) for the CVT input torque TcvtS is preprogrammed in such a manner as to be able to realize the target driving torque tTd, while compensating for the torque loss in the power-transmission mechanism (5, 6, 7).

Second, in step Sa7, a basic value TgenS of torque to be absorbed by the motor/generator B is retrieved from a preprogrammed or predetermined characteristic map $MAP_b$ showing how the absorbed-torque basic value TgenS has to be varied relative to the engine speed NiS[i] of the element number i in the one-dimensional array NiS[n] and the target generated electric energy tGEN. The map-retrieval is represented by the equation TgenS=$MAP_b$(NiS[i], tGEN). As per the map $MAP_b$(NiS[i], tGEN), the basic value TgenS of torque to be absorbed by the motor/generator B is preset or prestored in the memory in the form of map data, so that the target generated electric energy tGEN is realized at an arbitrary engine speed NiS[i]. Actually, the absorbed-torque basic value TgenS is properly related to both the engine speed NiS [i] and the target generated electric energy tGEN, accounting for the electric-power-generation efficiency of the motor/generator B.

Third, in step Sa8, for the purpose of providing both the target driving torque tTd and the target generated electric energy tGEN basically by means of the engine 2, a target engine torque tTeS is arithmetically calculated as the sum (TcvtS+TgenS) of the required CVT input torque TcvtS and the absorbed-torque basic value TgenS, from the following expression.

$$tTeS = TcvtS + TgenS$$

Then, in step Sa9, the engine fuel consumption FuelS[i] is map-retrieved on the basis of the target engine torque tTeS and the engine speed NiS[i], from a preprogrammed or predetermined map $MAP_{fuel}$ showing how the fuel consumption FuelS[i] has to be varied relative to both the target engine torque tTeS and the engine speed NiS[i]. The map-retrieval is represented as follows.

$$FuelS[i] = MAP_{fuel}(tTeS, NiS[i])$$

A series of computing actions (containing arithmetic calculations, and map-retrieval operations) from steps Sa6 to Sa9 are repeatedly executed for every engine speeds (for every array elements, that is, NiL, NiL+50, NiL+100, NiL+150, . . . , NiU) in the one-dimensional array NiS[n]. Thereafter, as soon as the condition of i>n is satisfied, the routine proceeds to step Sa10. In step Sa10, the lowest-order array element number j of all of the fuel consumption data FuelS[i] corresponding to the respective engine-speed indicative array elements NiS[i] (i.e., NiL, NiL+50, NiL+100, NiL+150, . . . , NiU) is selected or determined. In step Sa11, the engine speed NiS[j] of the lowest-order array element number j is set at the target motor/generator rotational speed tNi (=the target engine speed) as follows.

$$tNi = NiS[j]$$

Hereunder described in detail is a comparison between the motor/generator B rotational speed arithmetic-calculation method shown in FIG. 6 (the first modification) and the motor/generator B rotational speed arithmetic-calculation method shown in FIG. 4. As may be appreciated from comparison between the two arithmetic operations shown in FIGS. 4 and 6, there is the preprogrammed characteristic map (see the target motor/generator-B-rotational-speed triaxial map $MAP_{mi1}$ of step S5 of FIG. 4) which is included in the routine shown in FIG. 4 but not included in the routine shown in FIG. 6. Conversely, there is the preprogrammed characteristic map (see the engine-fuel-consumption biaxial map $MAP_{fuel}$ of step Sa9 of FIG. 6) which is included in the routine shown in FIG. 6 but not included in the routine shown in FIG. 4. In analyzing the amount of map data, assuming that the number of an axis grid (a coordinate grid) of each of the triaxial map $MAP_{mi1}$ of step S5 of FIG. 4 and the biaxial map $MAP_{fuel}$ of step Sa9 of FIG. 6 is 10, the number of the grid elements (that is, the number of data) of the triaxial map $MAP_{mi1}$ of step S5 is 1000 (i.e., 10×10×10). On the other hand, the number of the grid elements (that is, the number of data) of the biaxial map $MAP_{fuel}$ of step Sa9 is 100 (i.e., 10×10). Suppose, in computing the target engine speed (the target motor/generator B rotational speed tNi), two different input informational data, namely engine coolant temperature $T_E$ of the engine 2 and terminal voltage $V_B$ of the main battery 15, are further added to the vehicle speed vsp, the target driving torque tTd, and the target generated electric energy tGEN. In case of addition of both the coolant-temperature map-retrieval axis ($T_E$) and the main-battery terminal voltage map-retrieval axis ($V_B$), the computing method of FIG. 4 requires a preprogrammed five-axis map $MAP_{mi1}$(vsp, tTd, tGEN, $T_E$, $V_B$). If the number of an axis grid of each of the five-axial map $MAP_{mi1}$(vsp, tTd, tGEN, $T_E$, $V_B$) is 10, the amount of data included in the five-axis map $MAP_{mi1}$(vsp, tTd, tGEN, $T_E$, $V_B$) must be increased to 100000. Such an excessively large amount of data is impractical from the viewpoint of fitting of the data and memory capacities. In contrast to the above, the computing method of FIG. 6 merely requires a preprogrammed triaxial map $MAP_{fuel}$(tTeS, NiS[i], $T_E$) or a preprogrammed four-axis map $MAP_{fuel}$(tTeS, NiS[i], $T_E$, $V_B$). If the number of the axis grid is 10, the amount of data included in the triaxial map $MAP_{fuel}$(tTeS, NiS[i], $T_E$) is 1000. The amount of data included in the four-axis map $MAP_{fuel}$(tTeS, NiS[i], $T_E$, $V_B$) is 10000. As set out above, the first modification shown in FIG. 6 is superior to the target motor/generator B rotational speed arithmetic-calculation method executed in the routine of FIG. 4, from the viewpoint of the reduced amount of data, the lighter setting load of signal data values, and reduced memory capacities. In order for the computer to more accurately compute the target motor/generator B rotational speed tNi by adding both the coolant-temperature map-retrieval axis ($T_E$) and the main-battery terminal voltage map-retrieval axis ($V_B$) to the vehicle-speed map-retrieval axis (vsp), the target-driving-torque map-retrieval axis (tTd) and the target-generated-electric-energy map-retrieval axis (tGEN), it is advantageous to use the computation method of FIG. 6 rather than the computation method of FIG. 4. The computation method of FIG. 4 has a merit of reduced arithmetic operations. On the other hand, the number of arithmetic operations executed by the routine of FIG. 6 is comparatively great (see a series of steps Sa5–Sa9 repeatedly executed until the element-number indicative value i reaches the number n of elements in the array NiS[n]). As a matter of course, it is desirable to select the best one from the two computation methods of FIGS. 4 and 6 for the target motor/generator B rotational speed tNi, according to circumstances. As described above, when the clutch-engagement flag CLT is set or during the clutch engaged state, the fuel consumption FuelS[i] of the engine 2, needed to realize both the target driving torque tTd and the target generated electric energy tGEN, is efficiently computed within the predetermined engine speed range (NiL≦NiS[i]≦NiU), which range can be attained by the engine 2, on the basis of all of the fuel consumption data of the engine 2, the generated electric energy efficiency data of the motor/generator B, and the power-transmission efficiency data of the power-transmission mechanism (5, 6, 7). Then, the engine speed NiS[j] of the lowest fuel consumption (the lowest-order array element number j) is set at the target engine speed (the target motor/generator B rotational speed tNi). Thus, the amount of data used to compute the target engine speed tNi can be largely reduced. This effectively reduces memory capacities, and man-hour for setting of data. If the engine fuel consumption is affected by variations of the engine coolant temperature $T_E$, it is possible to preprogram or preset fuel-consumption indicative data for every engine operating points based on the engine coolant temperatures. In this case, the engine fuel consumption is computed within the predetermined engine speed range, on the basis of the actual engine coolant temperature $T_E$, and then the engine speed of the lowest fuel consumption is selected. In this manner, it is possible to realize the engine operating point of the lowest fuel consumption, based on the engine coolant temperature $T_E$. In the same manner, if the generated electric energy efficiency of the motor/generator B varies depending on variations of the main-battery terminal voltage $V_B$, it is possible to preprogram or preset motor/generator B generated electric energy efficiency indicative data for every engine operating points based on the main-battery terminal voltages. Therefore, the fuel consumption of the engine 2 is computed within the predetermined engine speed range, on the basis of the actual main-battery terminal voltage $V_B$, and then the engine speed of the lowest fuel consumption is selected. As discussed above, it is possible to realize the engine operating point of the lowest fuel consumption, based on the engine coolant temperature $T_E$ and/or the main-battery terminal voltage $V_B$.

Figure 10:
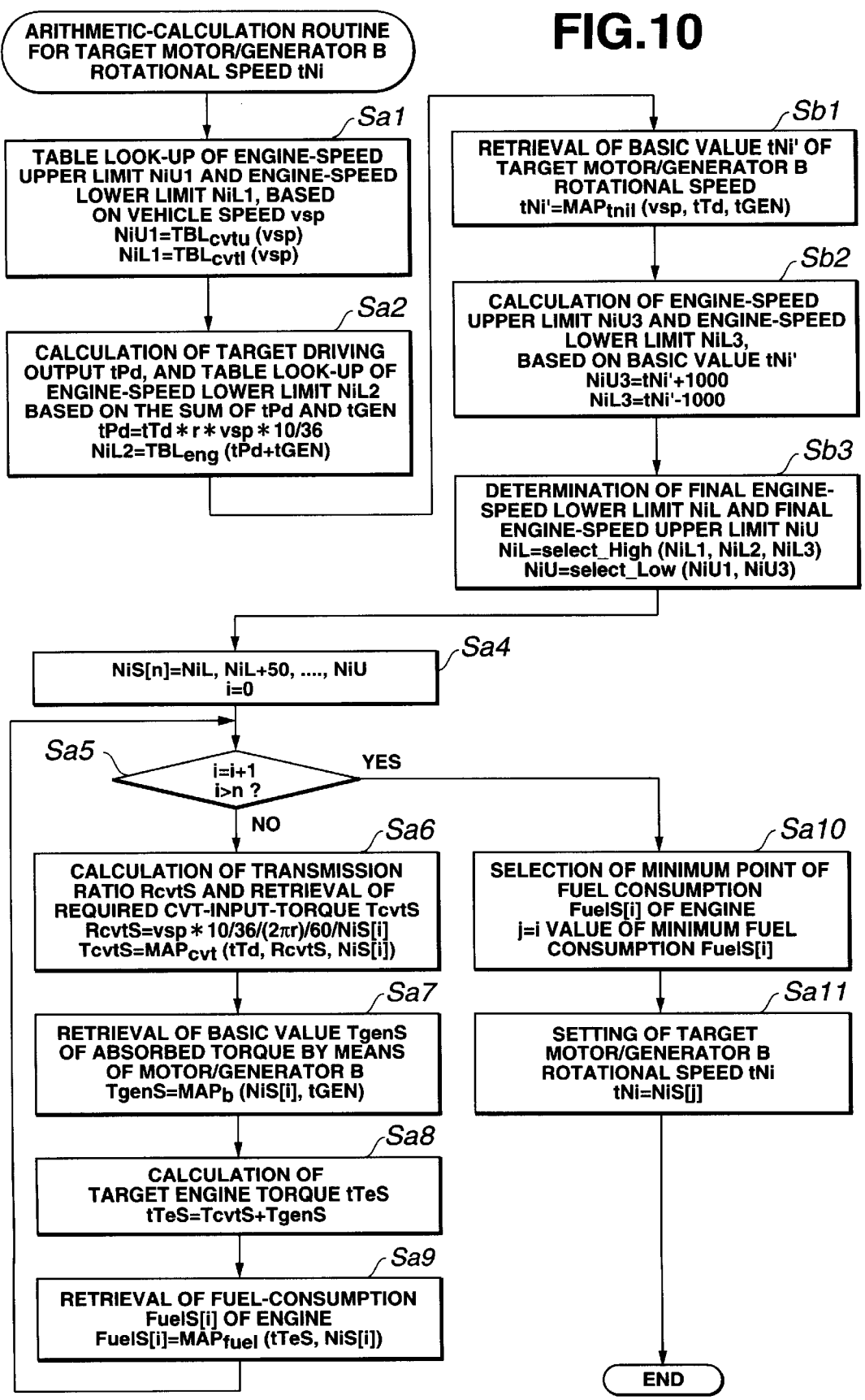
FIG. 10 is a flow chart illustrating a second modification for the desired motor B rotational speed (target engine speed tNi) arithmetic-calculation routine.

Referring now to FIG. 10, there is shown the second modification for the target motor/generator B rotational speed arithmetic-calculation executed through steps S1–S5 (see FIG. 4) when the clutch-engagement request flag CLT is set or during the clutch engaged state. The target motor/generator B rotational speed (tNi) computation routine shown in FIG. 10, which routine is needed to determine a predetermined engine speed range (an engine-speed lower limit NiL and an engine-speed upper limit NiU) used to compute the fuel consumption FuelS[i], is slightly different from that shown in FIG. 6, in that step Sa3 of the first modification of FIG. 6 is replaced by a series of steps Sb1–Sb3 of the second modification of FIG. 10.

In step Sb1, a basic value tNi' of the target motor/generator B rotational speed is map-retrieved on the basis of all of the vehicle speed vsp, the target driving torque tTd, and the target generated electric energy tGEN, from a preprogrammed or predetermined triaxial characteristic map $MAP_{tni1}$ showing how the target motor/generator B rotational speed basic value tNi' has to be varied relative to all of the vehicle speed vsp, the target driving torque tTd, and the target generated electric energy tGEN. The map-retrieval is represented by the equation tNi'=$MAP_{tni1}$(vsp, tTd, tGEN). The triaxial map $MAP_{tni1}$(vsp, tTd, tGEN) is a preprogrammed characteristic map relating to the target engine speed (=the target motor/generator B rotational speed) at which it is possible to attain or realize the vehicle speed vsp, the target driving torque tTd, and the target generated electric energy tGEN at the best engine efficiency (the lowest fuel consumption), while accounting for all of the engine efficiency, the motor/generator B efficiency (containing the motor/generator B output efficiency and the electric energy generation efficiency), and the power-transmission efficiency of the power-transmission mechanism including the CVT 5, the reduction gear 6, and the differential gear 7.

In step Sb2, an upper limit NiU3 and a lower limit NiL3 of the engine speed range (or the fuel-consumption computation range) are arithmetically calculated by the following expressions.

$$NiU3=tNi'+1000$$

$$NiL3=tNi'-1000$$

Through step Sb3, the final engine speed range (that is, the final engine-speed lower limit NiL and the final engine-speed upper limit NiU), needed to compute the fuel consumption FuelS[i], is determined. As appreciated from the following expressions, the final engine-speed lower limit NiL is determined as the highest one of the three data NiL1, NiL2, and NiL3, by way of a select-HIGH process, whereas the final engine-speed upper limit NiU is determined as the lower one of the two data NiU1 and NiU3, by way of a select-LOW process.

$$NiL=select\_High(NiL1, NiL2, NiL3)$$

$$NiU=select\_Low(NiU1, NiU3)$$

As discussed above, in the second modification, the basic value tNi' of the target engine speed is retrieved from the preprogrammed triaxial characteristic map $MAP_{tni1}$(vsp, tTd, tGEN) relating to the desired engine operating point (the target engine speed) at which it is possible to attain or realize the vehicle speed vsp, the target driving torque tTd, and the target generated electric energy tGEN at the best engine efficiency (the lowest fuel consumption). The fuel consumption FuelS[i] of the engine 2, needed to realize both the target driving torque tTd and the target generated electric energy tGEN, is computed in close vicinity to the target engine speed basic value tNi' within a predetermined engine speed range, on the basis of all of the engine fuel consumption efficiency data, the motor/generator B generated electric-energy efficiency data, and the power-transmission efficiency data of the power-transmission mechanism (5, 6, 7). Then, the engine speed NiS[j] corresponding to the engine operating point of the lowest fuel consumption (the lowest-order array element number j) is set at the target engine speed (=the target motor/generator B rotational speed tNi). Thus, the amount of data used to compute the target engine speed tNi can be largely reduced. This effectively reduces memory capacities and man-hour for setting of data. Furthermore, the engine speed range needed to compute the fuel consumption FuelS[i] can be limited to a minimum possible speed range. This lightens the load on arithmetic processing within the microcomputer, and shortens the arithmetic-operation time for the target engine speed tNi.

Hereunder described is the third modification for the target motor/generator B rotational speed arithmetic-calculation executed through steps S1–S5 (see FIG. 4) when the clutch-engagement request flag CLT is set or during the clutch engaged state wherein the engine speed is identical to the motor/generator B rotational speed. The target motor/generator B rotational speed (tNi) computation routine of the third modification is similar to that of the second modification shown in FIG. 10. Only a part of the computation method shown in FIG. 10 is modified. Thus, a point of difference between the second and third modifications is hereinafter described, while referring to the arithmetic-operation routine of the second modification shown in FIG. 10. The target engine speed arithmetic-calculation routine (i.e., the target motor/generator B rotational speed arithmetic-calculation routine) of the third modification uses the former-half (that is, steps Sa1, Sa2, and Sb1–Sb3) of the second modification shown in FIG. 10. In lieu of the latter-half (that is, steps Sa4–Sa11) of the second modification of FIG. 10, the third modification uses a series of new steps as described hereunder. In the third modification, note that the target motor/generator B rotational speed basic value (the target engine speed basic value) tNi' functions as an initial value needed to compute the engine fuel consumption FuelS.

According to the third modification, first of all, the target motor/generator B rotational speed basic value tNi' is map-retrieved through steps Sa1, Sa2 and Sb1 (see tNi'=$MAP_{tni1}$ (vsp, tTd, tGEN) of step Sb1). An engine-speed lower limit NiL and an engine-speed upper limit NiU are then determined through steps Sb2 and Sb3 in order to properly limit the engine speed range needed to compute the engine fuel consumption FuelS. After this, in the third modification, in arithmetically calculating the fuel consumption FuelS, the engine fuel consumption $FuelS_{(tNi')}$ obtained at the target engine speed basic value (or the target motor/generator B rotational speed basic value) tNi' is arithmetically calculated through a series of steps Sa6'–Sa9' substantially corresponding to steps Sa6–Sa9 of FIG. 10. In step Sa6' substantially corresponding to step Sa6, the actual transmission ratio RcvtS for the target engine speed basic value tNi' is arithmetically calculated from the following expression.

$$RcvtS=vsp\times 10/36/(2\pi r)/60/tNi'$$

where r denotes an effective radius of the drive wheel 8.
Then, a CVT input torque TcvtS is map-retrieved on the basis of all of the target driving torque tTd, the actual transmission ratio RcvtS, and the target engine speed basic value tNi', from a preprogrammed characteristic map $MAP_{cvt}$. The map-retrieval is represented as follows.

$$TcvtS = MAP_{cvt}(tTd, RcvtS, tNi')$$

The triaxial characteristic map $MAP_{cvt}$ for the CVT input torque TcvtS is preprogrammed in such a manner as to be able to realize the target driving torque tTd, while compensating for the torque loss in the power-transmission mechanism (5, 6, 7).

In step Sa7' substantially corresponding to step Sa7 of FIG. 10, a basic value TgenS of torque to be absorbed by the motor/generator B is retrieved from a preprogrammed or predetermined characteristic map $MAP_b$ showing how the absorbed-torque basic value TgenS has to be varied relative to the target engine speed basic value tNi' and the target generated electric energy tGEN. The map-retrieval is represented by the equation $TgenS = MAP_b(tNi', tGEN)$. As per the map $MAP_b(tNi', tGEN)$, in order to realize the target generated electric energy tGEN at the target engine speed basic value tNi', the basic value TgenS of torque to be absorbed by the motor/generator B is preset or prestored in the memory in the form of map data, and actually the absorbed-torque basic value TgenS is properly related to both the target engine speed basic value tNi' and the target generated electric energy tGEN, accounting for the electric-power-generation efficiency of the motor/generator B.

In the same manner as step Sa8 of FIG. 10, for the purpose of providing both the target driving torque tTd and the target generated electric energy tGEN basically by means of the engine 2, at step Sa8', a target engine torque tTeS is arithmetically calculated as the sum (TcvtS+TgenS) of the required CVT input torque TcvtS and the absorbed-torque basic value TgenS, from the following expression.

$$tTeS = TcvtS + TgenS$$

where $TcvtS = MAP_{cvt}(tTd, RcvtS, tNi')$, and $TgenS = MAP_b(tNi', tGEN)$.

Then, in step Sa9' substantially corresponding to step Sa9 of FIG. 10, the engine fuel consumption $FuelS_{(tNi')}$ obtained at the target engine speed basic value tNi' is map-retrieved on the basis of the target engine torque tTeS and the target engine speed basic value tNi', from a preprogrammed or predetermined map $MAP_{fuel}$ showing how the fuel consumption $FuelS_{(tNi')}$ has to be varied relative to both the target engine torque tTeS and the target engine speed basic value tNi'. The map-retrieval is represented as follows.

$$FuelS_{(tNi')} = MAP_{fuel}(tTeS, tNi')$$

Thereafter, on the assumption that two values close to the target engine speed basic value tNi', namely engine speed (tNi'−50) decreased by 50 rpm from the basic value (initial value) tNi', and engine speed (tNi'+50) increased by 50 rpm from the basic value (initial value) tNi', are both included within the predetermined map-retrieval range, the fuel consumption $FuelS_{(tNi'-50)}$ obtained at the engine speed (tNi'−50) and the fuel consumption $FuelS_{(tNi'+50)}$ obtained at the engine speed (tNi'+50) are computed in accordance with the same procedures as the arithmetic operation for computing the fuel consumption $FuelS_{(tNi')}$ obtained at the target engine speed basic value tNi'. After this, the fuel consumption $FuelS_{(tNi')}$ obtained at the target engine speed basic value tNi' is compared with the fuel consumption $FuelS_{(tNi'-50)}$ obtained at the engine speed (tNi'−50). When the fuel consumption $FuelS_{(tNi')}$ is above the fuel consumption $FuelS_{(tNi'-50)}$, that is, in case of $FuelS_{(tNi')} > FuelS(tNi'-50)$, the processor of the microcomputer determines that a lower fuel consumption exists within an engine speed range (<tNi') lower than the target engine speed basic value tNi'. Thus, the fuel consumption $FuelS_{(tNi'-100)}$ obtained at engine speed (tNi'−100) further decreased by 50 rpm from the engine speed (tNi'−50) is computed as described previously, and then the fuel consumption $FuelS_{(tNi'-50)}$ is compared with the fuel consumption $FuelS_{(tNi'-100)}$. Such engine-speed decrement procedures are repeatedly executed, until the fuel consumption $FuelS_{(tNi'-50k)}$ obtained at the engine speed (tNi'−50k) becomes less than the fuel consumption $FuelS_{(tNi'-50k-50)}$ obtained at the engine speed (tNi'−50k−50). The character k denotes a repeat count for the engine speed decrement procedures. The repeat count k is a natural number. In other words, in the arithmetic operation for computing the fuel consumption ($FuelS_{(tNi')}$, $FuelS_{(tNi'-50)}$, $FuelS_{(tNi'-100)}$, . . . ) for each engine speed (tNi', tNi'−50, tNi'−100, . . . ), decreasing in turn in revolution/minutes by 50 rpm, the previously-noted procedures are repeatedly executed, until the fuel consumption FuelS is changed from a decreasing tendency to an increasing tendency, that is, a minimal value $FuelS_{(tNi'-50k)}$ of the fuel consumption FuelS is detected. For the reasons set forth above, the engine speed (tNi'−50k) of the lowest fuel consumption $FuelS_{(tNi'\_50k)}$ is set at the target motor/generator B rotational speed (=the target engine speed) tNi. In contrast to the above, when the fuel consumption $FuelS_{(tNi')}$ is below the fuel consumption $FuelS_{(tNi'-50)}$, that is, in case of $FuelS_{(tNi')} < FuelS_{(tNi'-50)}$, the fuel consumption $FuelS_{(tNi')}$ obtained at the target engine speed basic value tNi' is compared with the fuel consumption $FuelS_{(tNi'+50)}$ obtained at the engine speed (tNi'+50). When the fuel consumption $FuelS_{(tNi')}$ is above the fuel consumption $FuelS_{(tNi'+50)}$, that is, in case of $FuelS_{(tNi')} > FUelS_{(tNi'+50)}$, the processor of the microcomputer determines that a lower fuel consumption exists within an engine speed range (>tNi') greater than the target engine speed basic value tNi'. Therefore, the fuel consumption $FuelS_{(tNi'+100)}$ obtained at engine speed (tNi'+100) further increased by 50 rpm from the engine speed (tNi' +50) is computed as described previously, and then the fuel consumption $FuelS_{(tNi'+50)}$ is compared with the fuel consumption $FuelS_{(tNi'+100)}$. Such engine-speed increment procedures are repeatedly executed, until the fuel consumption $Fuel_{S(tNi'+50k)}$ obtained at the engine speed (tNi'+50k) becomes less than the fuel consumption $FuelS_{(tNi'+50k+50)}$ obtained at the engine speed (tNi'+50k+50). In the arithmetic operation for computing the fuel consumption $FuelS_{(tNi')}$, $FuelS_{(tNi'+50)}$, $FuelS_{(tNi'+100)}$, . . . ) for each engine speed (tNi', tNi'+50, tNi'+100, . . . ), increasing in turn in revolution/minutes by 50 rpm, the previously-noted procedures are repeatedly executed, until the fuel consumption FuelS is changed from a decreasing tendency to an increasing tendency, that is, a minimal value $FuelS_{(tNi'+50k)}$ of the fuel consumption FuelS is detected. After this, the engine speed (tNi'+50k) of the lowest fuel consumption $FuelS_{(tNi+50k)}$ is set at the target motor/generator B rotational speed (=the target engine speed) tNi. As discussed above, in the third modification, the target engine speed basic value tNi' is retrieved from the preprogrammed triaxial characteristic map $MAP_{tni1}$(vsp, tTd, tGEN) relating to the desired engine operating point (the target engine speed) at which it is possible to realize all of the vehicle speed vsp, the target driving torque tTd, and the target generated electric energy tGEN at the best engine efficiency (the lowest fuel consumption). Also, the fuel consumption FuelS of the engine 2, needed to realize both the target driving torque tTd and the target generated electric energy tGEN, is computed within a predetermined engine speed range, on the basis of all of the engine fuel consumption efficiency data, the motor/generator B generated electric-energy efficiency data, and the power-transmission efficiency data of the power-transmission mechanism (5, 6, 7), while decreasing or increasing in turn in revolution/minutes by 50 rpm from the initial value (the target engine speed basic value) tNi'. Then, a certain engine speed, given just before or when the fuel consumption FuelS is changed from a decreasing tendency to an increasing tendency, is set at the target engine speed (=the target motor/generator B rotational speed tNi). Thus, the amount of data used to compute the target engine speed tNi can be largely reduced, thus effectively reducing memory capacities and man-hour for setting of data. Furthermore, according to the third modification, in order to rapidly detect the engine operating point of the lowest fuel consumption, arithmetic operations for the fuel consumption FuelS can develop only in such a direction as to reduce the fuel consumption FuelS. This eliminates wasteful arithmetic operations for the fuel consumption FuelS in such a direction as to build up the fuel consumption FuelS. Thus, the engine speed range needed to compute the fuel consumption FuelS can be more effectively limited to a minimum possible speed range, thus more effectively lightening the load on arithmetic processing within the microcomputer, and also shortening the arithmetic-operation time for the target engine speed tNi.

Figure 11:
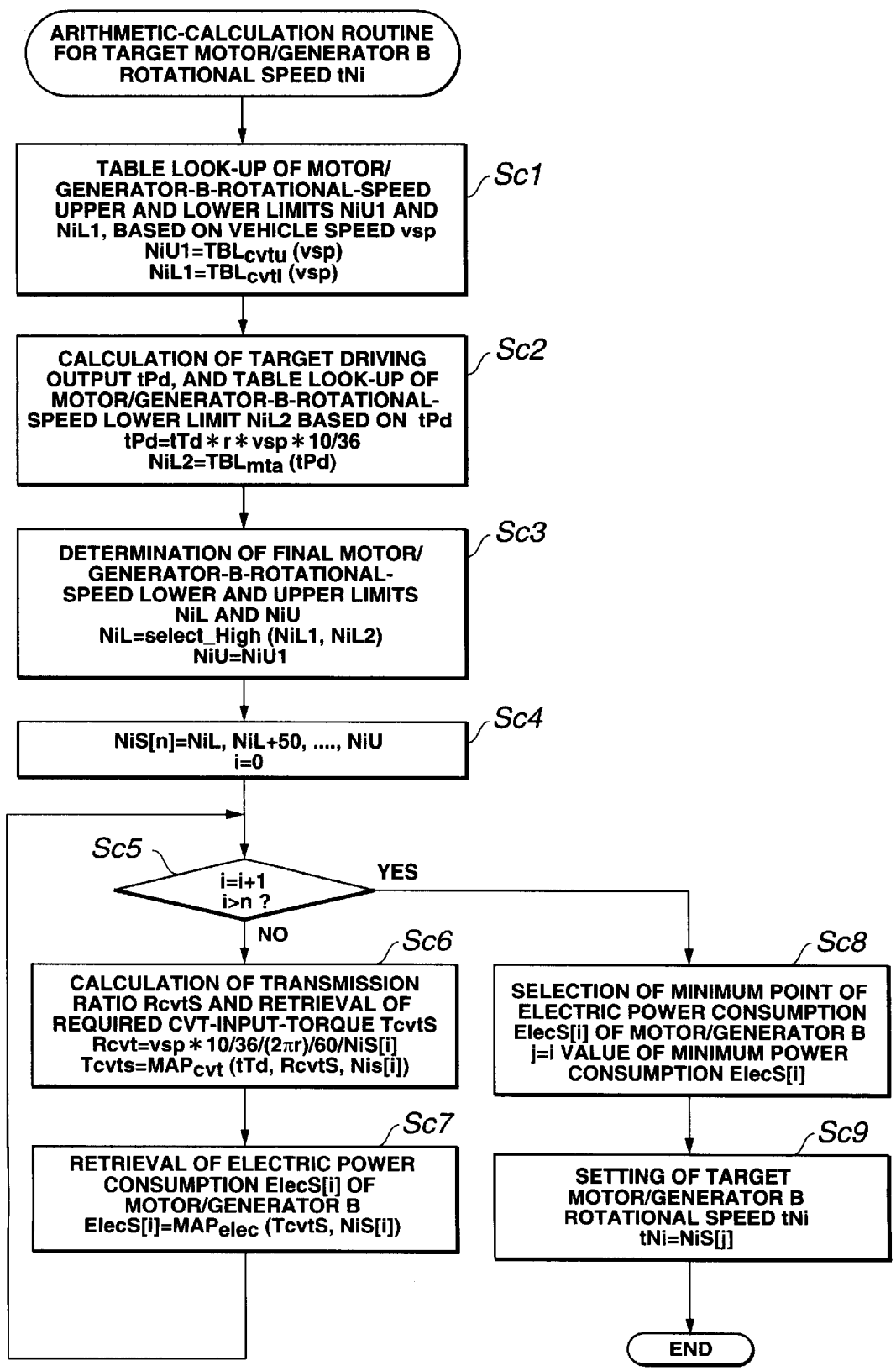
FIG. 11 is a flow chart illustrating a fourth modification for the desired motor B rotational speed (tNi) arithmetic-calculation routine.

Hereunder described in reference to FIG. 11 is the fourth modification for the target motor/generator B rotational speed arithmetic-calculation executed through steps S1, S2, S3 and S14 (see FIG. 4) when the clutch-engagement request flag CLT is reset or during the clutch disengaged state wherein the motor/generator B rotational speed Nb varies irrespective of the engine speed Ne. As previously described, upper and lower limits of the motor/generator B rotational speed, both varying depending on the vehicle speed vsp, are limited owing to the speed-change control characteristics for the CVT 5 and the structural limits of the CVT 5.

According to the target motor/generator B rotational speed (tNi) arithmetic-calculation routine of the fourth modification of FIG. 11, first of all, in step Sc1, a motor/generator B rotational speed upper limit NiU1 and a motor/generator B rotational speed lower limit NiL1 are looked-up from a preprogrammed look-up table $TBL_{cvtu}$ showing how the upper limit NiU1 has to be varied relative to the vehicle speed vsp and a preprogrammed look-up table $TBL_{cvt1}$ showing how the lower limit NiL1 has to be varied relative to the vehicle speed vsp. These table look-up operations are represented by the equations NiU1=$TBL_{cvtu}$(vsp) and NiL1=$TBL_{cvt1}$(vsp). For instance, assuming that the motor/generator B rotational speed range is defined by the speed-change control characteristic map shown in FIG. 7, and the input informational data signal value indicative of vehicle speed vsp is a certain vehicle speed value vsp0, the motor/generator B rotational speed upper limit NiU0 and the motor/generator B rotational speed lower limit NiL0 can be given as follows.

$$NiU0=TBL_{cvtu}(vsp0)$$

$$NiL0=TBL_{cvt1}(vsp0)$$

In step Sc2, a target power output tPd, needed to realize the target driving torque tTd, is arithmetically calculated from the following expression.

$$tPd=tTd \times r \times vsp \times 10/36$$

where r denotes an effective radius of the driving wheel 8.

In the same step Sc2, the motor/generator B rotational speed lower limit NiL2, needed to realize a time rate of doing work for the target output power tPd, is then looked up from a preprogrammed look-up table $TBL_{mta}$. The table look-up operation is represented by the equation NiL2=$TBL_{mta}$(tPd). As discussed above, there are various power losses, such as energy loss in the motor/generator B and energy loss in the power-transmission mechanism including the CVT 5, the reduction gear 6, and the differential 7. Thus, a total output (A+B) of an output value A corresponding to the time rate of doing work for the target output power tPd, and these energy losses B must be produced by the motor/generator B. Such a motor/generator B operating point must be necessarily set at an operating point having a motor/generator B rotational speed greater than the motor/generator B rotational speed lower limit NiL2. In this manner, in arithmetically calculating the target motor/generator B rotational speed, the motor/generator B rotational speed range (the motor/generator B rotational speed upper and lower limits NiU1 and NiL1), needed to compute the electric power consumption ElecS, are set within a speed range in which the time rate of doing work for the target output power tPd can be realized by means of the motor/generator B. This effectively eliminates unreasonable arithmetic calculations for the electric power consumption, for example arithmetic operations at speeds below the table-looked-up motor/generator-B-rotational-speed lower limit NiL2. This effectively reduces the load to arithmetic calculations within the microcomputer, thus ensuring quick computation for the target motor/generator B rotational speed.

Through step Sc3, the final motor/generator B rotational speed range (i.e., the final motor/generator-B-rotational-speed lower limit NiL and the final motor/generator-B-rotational-speed upper limit NiU), needed to compute the electric power consumption ElecS, is determined. The final motor/generator-B-rotational-speed lower limit NiL is determined as the higher one of the two table-looked-up data NiL1 and NiL2, by way of a select-HIGH process NiL=select_High(NiL1, NiL2), whereas the final motor/generator-B-rotational-speed upper limit NiU is set at the table-looked-up data NiU1 (=$TBL_{cvtu}$(vsp)).

In step Sc4, as a one dimensional array NiS[n] for motor/generator B rotational speeds, needed to compute the electric power consumption ElecS, a series of motor/generator B rotational speeds NiS[n], ranging from the previously-noted motor/generator-B-rotational-speed lower limit NiL to the previously-noted motor/generator-B-rotational-speed upper limit NiU and increasing in turn in revolution/minutes by 50 rpm are produced as follows.

$$NiS[n]=NiL, NiL+50, NiL+100, NiL+150, \ldots, NiU$$

where, n denotes the number of elements in the onedimensional array NiS[n].

At the same time, a value i indicative of the element number in the array NiS[n] is set at an initial value "0". The initialization of the element-number indicative value i is represented by the equation i=0.

In step Sc5, the element-number indicative value i is incremented by "1" (i.e., i=i+1), and then the incremented element-number indicative value i is compared with the number n of elements in the array NiS [n]. When the incremented element-number indicative value i is less than or equal to n (i≦n), step Sc6 occurs. Conversely, when the incremented element-number indicative value i is greater than n (i>n), step Sc8 occurs. In case of i≦n, a motor/generator B electric power consumption rate ElecS[i] obtained at a motor/generator B rotational speed NiS[i]

corresponding to the element number i in the one-dimensional array NiS[n], is computed or calculated, by way of two steps Sc6 and Sc7.

First, in step Sc6, the actual transmission ratio RcvtS for the motor/generator B rotational speed NiS[i] is arithmetically calculated from the following expression.

$$RcvtS=vsp\times10/36/(2\pi r)/60/NiS[i]$$

where r denotes an effective radius of the drive wheel 8. Then, a CVT input torque TcvtS is map-retrieved on the basis of all of the target driving torque tTd, the actual transmission ratio RcvtS, and the motor/generator B rotational speed NiS[i], from a preprogrammed characteristic map $MAP_{cvt}$. The map-retrieval is represented as follows.

$$TcvtS=MAP_{cvt}(tTd, RcvtS, NiS[i])$$

The characteristic map $MAP_{cvt}$(tTd, RcvtS, NiS[i]) for the CVT input torque TcvtS is preprogrammed in such a manner as to be able to realize the target driving torque tTd, while compensating for the torque loss in the power-transmission mechanism (5, 6, 7).

Second, in step Sc7, the electric power consumption ElecS[i] of the motor/generator B is map-retrieved on the basis of the CVT input torque TcvtS and the motor/generator B rotational speed NiS[i] of the element number i, from a preprogrammed map $MAP_{elec}$ showing how the electric power consumption ElecS[i] has to be varied relative to both the CVT input torque TcvtS and the motor/generator B rotational speed NiS[i]. The map-retrieval is represented as follows.

$$ElecS[i]=MAP_{elec}(TcvtS, NiS[i])$$

A series of computing actions (containing arithmetic calculation, and map-retrieval operations) from step Sc6 to Sc7 are repeatedly executed for every motor/generator B rotational speeds (for every elements, that is, NiL, NiL+50, NiL+100, NiL+150, . . . , NiU) in the onedimensional array NiS[n]. Thereafter, as soon as the condition of i>n is satisfied, the routine proceeds to step Sc8. In step Sc8, the lowest-order array element number j of all of the electric power consumption data ElecS[i] corresponding to the respective motor/generator-B-rotational-speed indicative array elements NiS[i] (i.e., NiL, NiL+50, NiL+100, NiL+150, . . . , NiU) is selected or determined. In step Sc9, the motor/generator B rotational speed NiS[j] of the lowest-order array element number j is set at the target motor/generator rotational speed tNi as follows.

$$tNi=NiS[j]$$

As described above, the electric power consumption ElecS[i] of the motor/generator B, needed to realize only the target driving torque tTd, is arithmetically computed within the predetermined motor/generator B rotational speed range (NiL≦NiS[i]≦NiU) which can be attained by the motor/generator B, on the basis of all of the output efficiency data of the motor/generator B, and the power-transmission efficiency data of the power-transmission mechanism (5, 6, 7). Then, the motor/generator B rotational speed NiS[j] of the lowest electric power consumption (the lowest-order array element number j) is set at the target motor/generator B rotational speed tNi. Thus, the amount of data used to compute the target motor/generator B rotational speed tNi can be largely reduced. This effectively reduces memory capacities, and man-hour for setting of data. If the output efficiency of the motor/generator B varies depending on variations of the main-battery terminal voltage $V_B$, it is possible to preprogram or preset motor/generator B output efficiency indicative data for every motor/generator B operating points based on the main-battery terminal voltages. In this case, the electric power consumption of the motor/generator B can be computed within the predetermined motor/generator B rotational speed range, on the basis of the actual main-battery terminal voltage $V_B$, and then the motor/generator B rotational speed of the lowest electric power consumption is selected. In this manner, it is possible to realize the motor/generator operating point of the lowest electric power consumption, based on the main-battery terminal voltage $V_B$.

Hereunder described is the fifth modification for the target motor/generator B rotational speed arithmetic-calculation executed through steps S1, S2, S3 and S14 (see FIG. 4) when the clutch-engagement request flag CLT is reset or during the clutch disengaged state wherein the motor/generator B rotational speed Nb varies irrespective of the engine speed Ne. The target motor/generator B rotational speed (tNi) computation routine of the fifth modification, which routine determines a predetermined motor/generator B rotational speed range (a motor/generator-B-rotational-speed lower limit NiL and a motor/generator-B-rotational-speed upper limit NiU) used to compute the electric power consumption ElecS[i], is slightly different from that of the fourth modification shown in FIG. 11, in that step Sc3 of the fourth modification of FIG. 11 is replaced by a series of steps Sb1'–Sb3', which are similar to steps Sb1–Sb3 of the second modification of FIG. 10 and will be hereunder described in detail. The other steps of the routine of the fifth modification are identical to those of the routine of the fourth modification of FIG. 11, and thus detailed description of steps Sc1, Sc2, and Sc4–Sc9 will be omitted because the above description thereon seems to be selfexplanatory.

According to the routine of the fifth modification, step Sb1' occurs subsequently to steps Sc1 and Sc2. At step Sb1', a basic value tNi' of the target motor/generator B rotational speed is retrieved on the basis of both the vehicle speed vsp and the target driving torque tTd, from a preprogrammed biaxial map MAPtnio(vsp, tTd) showing how the target motor/generator B rotational speed basic value tNi' has to be varied relative to both the vehicle speed vsp and the target driving torque tTd. The map-retrieval is represented by the equation tNi'=MAPtnio(vsp, tTd). The biaxial map $MAP_{tnio}$ (vsp, tTd) is a preprogrammed characteristic map relating to the target motor/generator B rotational speed at which it is possible to attain or realize the vehicle speed vsp and the target driving torque tTd at the best motor/generator B operating point (the lowest electric power consumption), while accounting for both the motor/generator B output efficiency and the power-transmission efficiency of the power-transmission mechanism including the CVT 5, the reduction gear 6, and the differential gear 7.

In step Sb2', an upper limit NiU3 and a lower limit NiL3 of the motor/generator B rotational speed range (or the electric-power-consumption computation range) are arithmetically calculated by the following expressions.

$$NiU3=tNi'+1000$$

$$NiL3=tNi'-1000$$

Thereafter, in step Sb3', the final motor/generator B rotational speed range (that is, the final motor/generator B rotational speed lower limit NiL and the final motor/generator B rotational speed upper limit NiU), needed to compute the electric power consumption ElecS[i], is determined. The final motor/generator B rotational speed lower limit NiL is determined as the highest one of the three data NiL1, NiL2, and NiL3, by way of a select-HIGH process NiL=select_High(NiL1, NiL2, NiL3), whereas the final motor/generator B rotational speed upper limit NiU is determined as the lower one of the two data NiU1 and NiU3, by way of a select-LOW process NiU=select_Low(NiU1, NiU3).

As discussed above, in the fifth modification, the target motor/generator B rotational speed basic value tNi' is map-retrieved on the basis of both the vehicle speed vsp and the target driving torque tTd from the preprogrammed biaxial characteristic map $MAP_{tni0}$(vsp, tTd) relating to the target motor/generator B rotational speed and capable of realizing the vehicle speed and the target driving torque at the lowest electric power consumption. The electric power consumption ElecS[i] of the motor/generator B, needed to realize only the target driving torque tTd, is computed in close vicinity to the target motor/generator B rotational speed basic value tNi' within a predetermined motor/generator B rotational speed range, on the basis of both the motor/generator B output efficiency data and the power-transmission efficiency data of the power-transmission mechanism (5, 6, 7). Then, the motor/generator B rotational speed NiS[j] corresponding to the motor/generator B operating point of the lowest electric power consumption (the lowest-order array element number j) is set at the target motor/generator B rotational speed tNi. Thus, the amount of data used to compute the target motor/generator B rotational speed tNi can be largely reduced. This effectively reduces memory capacities and man-hour for setting of data. In addition, the motor/generator B rotational speed range needed to compute the electric power consumption ElecS[i] can be limited to a minimum possible motor/generator B rotational speed range. This lightens the load on arithmetic processing within the microcomputer, and shortens the arithmetic-operation time for the target motor/generator B rotational speed tNi, when the clutch-engagement request flag CLT is cleared or during the clutch disengaged state.

Hereunder described is the sixth modification for the target motor/generator B rotational speed arithmetic-calculation executed through steps S1, S2, S3 and S14 (see FIG. 4) when the clutch-engagement request flag CLT is reset or during the clutch disengaged state wherein the motor/generator B rotational speed Nb varies irrespective of the engine speed Ne. The target motor/generator B rotational speed (tNi) computation routine of the sixth modification is similar to that of the fourth modification shown in FIG. 11. Only a part of the computation method shown in FIG. 11 is modified. Thus, a point of difference between the fourth and sixth modifications is hereinafter described, while referring to the arithmetic-operation routine of the fourth modification shown in FIG. 11. The target motor/generator B rotational speed arithmetic-calculation routine of the sixth modification uses steps Sc1–Sc3 of the fourth modification shown in FIG. 11. In lieu of steps Sc4–Sc9 of the fourth modification of FIG. 11, the sixth modification uses a series of new steps as described hereunder. In the sixth modification, note that a target motor/generator B rotational speed basic value tNi' is map-retrieved from a preprogrammed map $MAP_{tni0}$(vsp, tTd), and also the target motor/generator B rotational speed basic value tNi' functions as an initial value needed to compute the electric power consumption ElecS of the motor/generator B.

According to the sixth modification, first, the motor/generator B rotational speed range (NiL, NiU), needed to compute the electric power consumption ElecS, is determined through steps Sc1–Sc3. Then, the target motor/generator B rotational speed basic value tNi' is map-retrieved from a preprogrammed map $MAP_{tni0}$(vsp, tTd). The map-retrieval is represented as follows.

$$tNi'=MAP_{tni0}(vsp, tTd)$$

The biaxial map MAPtnio is a preprogrammed characteristic map relating to the target motor/generator B rotational speed tNi at which it is possible to attain or realize the vehicle speed vsp and the target driving torque tTd at the best motor/generator B efficiency (the lowest electric power consumption). As a matter of course, the motor/generator B operating point of the best efficiency (the lowest electric power consumption), suitable for both the vehicle speed and the driver's required driving torque, can be determined by virtue of the map $MAP_{tni0}$. After this, the electric power consumption $ElecS_{(tNi')}$ obtained at the target motor/generator B rotational speed basic value tNi' is calculated through steps Sc6' and Sc7' substantially corresponding to steps Sc6 and Sc7. Concretely, in step Sc6' substantially corresponding to step Sc6 of FIG. 11, the actual transmission ratio RcvtS for the target motor/generator B rotational speed basic value tNi' is arithmetically calculated from the following expression.

$$RcvtS=vsp\times10/36/(2\pi r)/60/tNi'$$

where r denotes an effective radius of the drive wheel 8.

Then, a CVT input torque TcvtS is map-retrieved on the basis of all of the target driving torque tTd, the actual transmission ratio RcvtS, and the target motor/generator B rotational speed basic value tNi', from a preprogrammed characteristic map $MAP_{cvt}$(tTd, RcvtS, tNi')

$$TcvtS=MAP_{cvt}(tTd, RcvtS, tNi')$$

The characteristic map $MAP_{cvt}$(tTd, RcvtS, tNi') for the CVT input torque TcvtS is preprogrammed in such a manner as to be able to realize the target driving torque tTd, while compensating for the torque loss in the power-transmission mechanism (5, 6, 7).

In step Sc7' substantially corresponding to step Sc7 of FIG. 11, the electric power consumption $ElecS_{(tNi')}$ obtained at the target motor/generator B rotational speed basic value tNi' is map-retrieved on the basis of the CVT input torque TcvtS and the target motor/generator B rotational speed basic value tNi', from a preprogrammed or predetermined characteristic map $MAP_{elec}$ showing how the electric power consumption ElecS has to be varied relative to both the CVT input torque TcvtS and an arbitrary motor/generator B rotational speed. The map-retrieval is represented as follows.

$$ElecS=MAP_{elec}(TcvtS, tNi')$$

The biaxial map $MAP_{elec}$ is prestored in the memory as a predetermined electric-power consumption map, so that the CVT input torque TcvtS is realized at an arbitrary motor/generator B rotational speed. Actually, the electric power consumption ElecS is properly related to both the motor/generator B rotational speed and the target CVT input torque TcvtS, accounting for the output efficiency of the motor/generator B.

Thereafter, on the assumption that two values close to the target motor/generator B rotational speed basic value tNi', namely a motor/generator B rotational speed (tNi'–50) decreased by 50 rpm from the basic value tNi', and a motor/generator B rotational speed (tNi'+50) increased by 50 rpm from the basic value tNi', are both included within the predetermined map-retrieval range, the electric power consumption $ElecS_{(tNi'-50)}$ obtained at the motor/generator B rotational speed (tNi'−50) and the electric power consumption $ElecS_{(tNi'+50)}$ obtained at the motor/generator B rotational speed (tNi'+50) are computed in accordance with the same procedures as the arithmetic-operation for computing the electric power consumption $ElecS_{(tNi')}$ obtained at the target motor/generator B rotational speed basic value tNi'. After this, the electric power consumption $ElecS_{(tNi')}$ obtained at the target motor/generator B rotational speed basic value tNi' is compared with the electric power consumption $ElecS_{(tNi'-50)}$ obtained at the motor/generator B rotational speed (tNi'−50). When the electric power consumption $ElecS_{(tNi')}$ is above the electric power consumption $ElecS_{(tNi'-50)}$ that is, in case of $ElecS_{(tNi')} > ElecS_{(tNi'-50)}$, the processor of the microcomputer determines that a lower electric power consumption exists within a motor/generator B rotational speed range (<tNi') lower than the target motor/generator B rotational speed basic value tNi'. Thus, the electric power consumption $ElecS_{(tNi'-100)}$ obtained at a motor/generator B rotational speed (tNi'−100) further decreased by 50 rpm from the motor/generator B rotational speed (tNi'−50) is computed as described previously, and then the electric power consumption $ElecS_{(tNi'-50)}$ is compared with the electric power consumption $ElecS_{(tNi'-100)}$. Such motor/generator-B-rotational-speed decrement procedures are repeatedly executed, until the electric power consumption $ElecS_{(tNi'-50k)}$ obtained at the motor/generator B rotational speed (tNi'−50k) becomes less than the electric power consumption $ElecS_{(tNi'-50k-50)}$ obtained at the motor/generator B rotational speed (tNi'−50k−50). The character k denotes a repeat count for the motor/generator B rotational speed decrement procedures. The repeat count k is a natural number. In other words, in the arithmetic operation for computing the electric power consumption ($ElecS_{(tNi')}$, $ElecS_{(tNi'-50)}$. $ElecS_{(tNi'-100)}$, ..) for each motor/generator B rotational speed (tNi', tNi'−50, tNi'−100, ... ), decreasing in turn in revolution/minutes by 50 rpm, the previouslynoted procedures are repeatedly executed, until the electric power consumption ElecS is changed from a decreasing tendency to an increasing tendency, that is, a minimal value $ElecS_{(tNi'-50k)}$ of the electric power consumption ElecS is detected. For the reasons set forth above, the motor/generator B rotational speed (tNi'−50k) of the lowest electric power consumption $ElecS_{(tNi'-50k)}$ is set at the target motor/generator B rotational speed tNi. In contrast to the above, when the electric power consumption $ElecS_{(tNi')}$ is below the electric power consumption $ElecS_{(tNi'-50)}$, that is, in case of $ElecS_{(tNi')} < ElecS_{(tNi'-50)}$, the electric power consumption $ElecS_{(tNi')}$ obtained at the target motor/generator B rotational speed basic value tNi' is compared with the electric power consumption $ElecS_{(tNi'+50)}$ obtained at the motor/generator B rotational speed (tNi'+50). When the electric power consumption $ElecS_{(tNi')}$ is above the electric power consumption $ElecS_{(tNi'+50)}$, that is, in case of $ElecS_{(tNi')} > ElecS_{(tNi'+50)}$, the processor of the microcomputer determines that a lower electric power consumption exists within a motor/generator B rotational speed range (>tNi') greater than the target motor/generator B rotational speed basic value tNi'. Therefore, the electric power consumption $ElecS_{(tNi'+100)}$ obtained at a motor/generator B rotational speed (tNi'+100) further increased by 50 rpm from the motor/generator B rotational speed (tNi'+50) is computed as described previously, and then the electric power consumption $ElecS_{(tNi'+50)}$ is compared with the electric power consumption $ElecS_{(tNi'+100)}$. Such motor/generator-B-rotational-speed increment procedures are repeatedly executed, until the electric power consumption $ElecS_{(tNi'+50k)}$ obtained at the motor/generator B rotational speed (tNi'+50k) becomes less than the electric power consumption $ElecS_{(tNi'+50k+50)}$ obtained at the motor/generator B rotational speed (tNi'+50k+50). In the arithmetic operation for computing the electric power consumption ($ElecS_{(tNi')}$, $ElecS_{(tNi'+50)}$. $ElecS_{(tNi'+100)}$, ... ) for each motor/generator B rotational speed (tNi', tNi'+50, tNi'+100, ... ), increasing in turn in revolution/minutes by 50 rpm, the previously-noted procedures are repeatedly executed, until the electric power consumption ElecS is changed from a decreasing tendency to an increasing tendency, that is, a minimal value $ElecS_{(tNi'+50k)}$ of the electric power consumption ElecS is detected. After this, the motor/generator B rotational speed (tNi'+50k) of the lowest electric power consumption $ElecS_{(tNi'+50k)}$ is set at the target motor/generator B rotational speed tNi. As discussed above, in the sixth modification, the target motor/generator B rotational speed basic value tNi' is retrieved from the preprogrammed biaxial characteristic map $MAP_{ni0}$(vsp, tTd) relating to the desired motor/generator B operating point (the target motor/generator rotational speed) at which it is possible to attain or realize the vehicle speed vsp and the target driving torque tTd at the best motor/generator B output efficiency (the lowest electric powerconsumption). The electric power consumption ElecS of the motor/generator B, needed to realize only the target driving torque tTd, is computed within a predetermined motor/generator B rotational speed range, on the basis of all of the motor/generator B output efficiency data and the power-transmission efficiency data of the power-transmission mechanism (5, 6, 7), while decreasing or increasing in turn in revolution/minutes by 50 rpm from the initial value (the target motor/generator B rotational speed basic value) tNi'. Then, a certain motor/generator B rotational speed, given just before or when the electric power consumption ElecS is changed from a decreasing tendency to an increasing tendency, is set at the target motor/generator B rotational speed tNi. Thus, the amount of data used to compute the target engine speed tNi can be largely reduced, thus effectively reducing memory capacities and man-hour for setting of data. Furthermore, according to the sixth modification, in order to rapidly detect the motor/generator B operating point of the lowest electric power consumption, arithmetic operations for the electric power consumption ElecS can develop only in such a direction as to decrease the electric power consumption ElecS. This eliminates wasteful arithmetic operations for the electric power consumption ElecS in such a direction as to increase the electric power consumption ElecS. Thus, the motor/generator B rotational speed range needed to compute the electric power consumption ElecS can be more effectively limited to a minimum possible speed range, thus more remarkably lightening the load on arithmetic processing within the microcomputer, and also shortening the arithmetic-operation time for the target motor/generator B rotational speed tNi.

As previously described, the generating routine for the desired values of operations in the embodiment shown in FIG. 4 and in the first to sixth modifications explained in reference to FIGS. 6, 10, and 11, are exemplified in a parallel hybrid vehicle propelled by an internal combustion engine and/or a motor/generator. It will be easily understood that the generating routine for the desired values of operations, executed at steps S11 to S16 shown in FIG. 4 when the clutch-engagement request flag CLT is reset or during the clutch disengaged state, and the target motor/generator B rotational speed arithmetic-calculation routine of the fourth and fifth modifications are applicable to an electric vehicle as well as a parallel hybrid vehicle employing a parallel hybrid system.

In the system of the embodiment and the first to sixth embodiments, the target driving torque tTd is map-retrieved on the basis of the vehicle speed vsp and the accelerator opening (the accelerator depression degree) acc from the predetermined or preprogrammed characteristic map $MAP_{ttd}$(vsp, acc). In lieu of the accelerator opening acc, the vehicle operating conditions, and traffic situation or traffic environment such as during off-peak hours or traffic jams, may be used as parameters necessary to compute the target driving torque tTd. For instance, suppose the concept of the invention is applied in an automotive vehicle employing an inter-car distance control system which suitably controls the distance to the car up ahead and maintains the inter-car distance between cars at a desired distance (a safe vehicle interval), or in an automotive vehicle employing a preceding-vehicle following drive system which maintains an inter-car distance from a car behind to a preceding car running ahead to follow up the preceding car, and arithmetically calculates the target driving torque so that the vehicle speed of own car is adjusted toward the same vehicle speed as forward car. In this case, a target vehicle speed vsp* is, first, determined on the basis of the inter-car distance to the preceding car. Then, a target driving torque tTd is arithmetically calculated on the basis of the target vehicle speed vsp* for example from the following expression.

$$tTd=For \cdot r/Rcvt/Rf$$

$$For=Md(vsp*)/dt$$

where For denotes a target driving force, Rf denotes a final gear ratio, r denotes an effective radius of the tire of the drive wheel 8, M denotes a mass of the vehicle, and d(vsp*)/dt denotes the time rate of change of the target vehicle speed vsp*.

As discussed above, if the driving force control system of the invention is used together with an inter-car distance control system or a preceding-vehicle following drive system, it is possible to realize an advanced hybrid vehicle which can drive automatically while sensing traffic information such as traffic jams, road surface conditions, and/or road conditions affected by weather.

Furthermore, in the driving force control system of the embodiment and the first to third modifications, the target engine speed (=the motor/generator B rotational speed tNi) at which it is possible to realize the vehicle speed vsp, the target driving torque tTd, and the target generated electric energy tGEN while accounting for all of the engine efficiency, the motor/generator B efficiency, and the power-transmission efficiency of the power-transmission mechanism (5, 6, 7), is computed or retrieved from the predetermined or preprogrammed characteristic map. Thereafter, the transmission ratio of the CVT 5 is controlled so that the actual engine speed is adjusted toward the target engine speed tNi computed. In lieu of computation for the target engine speed tNi, a target transmission ratio (or a desired transmission ratio) of the CVT 5 may be computed. That is, the target transmission ratio at which it is possible to realize all of the vehicle speed vsp, the target driving torque tTd, and the target generated electric energy tGEN at the lowest fuel consumption (the best efficiency of the engine 2), while accounting for all of the engine efficiency, the motor/generator B efficiency, and the power-transmission efficiency of the power-transmission mechanism (5, 6, 7), is, first of all, arithmetically calculated, and then the CVT 5 is controlled so that the actual transmission ratio of the CVT 5 is adjusted toward the target transmission ratio. For instance, the target transmission ratio of the CVT 5 may be map-retrieved on the basis of all of the vehicle speed vsp, the target driving torque tTd, and the target generated electric energy tGEN, from a target-transmission-ratio characteristic map preprogrammed such that all of the vehicle speed vsp, the target driving torque tTd, and the target generated electric energy tGEN can be realized at the lowest fuel consumption. With the previouslynoted arrangement, it is possible to operate the engine 2 at the best engine operating point for all of the vehicle speed, the driver's required driving torque, and the required electric energy. Thus, it is possible to operate the engine 2 always at the best operating point of the best engine efficiency (the lowest fuel consumption), even when the ratio of the required-driving-torque dependent power to the required-electric-energy-generation dependent power is varying. Also, it is possible to accurately attain both the time rate of doing work for the driver's required driving torque and the time rate of doing work for the required generated electric energy, since the target transmission ratio of the CVT 5 is computed accounting for all of the engine efficiency, the motor/generator B efficiency, and the power-transmission efficiency of the power-transmission mechanism (5, 6, 7). Furthermore, such target transmission ratio as to realize all of the vehicle speed, the target driving torque and the target generated electric energy at the lowest fuel consumption, can be determined by way of map-retrieval from the preprogrammed characteristic map, thus enabling easy and rapid arithmetic operation for the target transmission ratio (which ratio ensures the best engine operating point of the lowest fuel consumption), by means of a microcomputer.

Moreover, in the driving force control system of the embodiment and the fourth to sixth modifications, the target motor/generator B rotational speed tNi at which it is possible to realize both the vehicle speed vsp and the target driving torque tTd at the lowest electric power consumption while accounting for both the motor/generator B efficiency and the power-transmission efficiency of the power-transmission mechanism (5, 6, 7), is retrieved from the predetermined or preprogrammed characteristic map. Then, the transmission ratio of the CVT 5 is controlled so that the actual motor/generator B rotational speed is adjusted toward the target motor/generator B rotational speed tNi computed or map-retreived. In lieu of computation for the target motor/generator B rotational speed tNi, a target transmission ratio (or a desired transmission ratio) of the CVT 5 may be computed. That is, the target transmission ratio at which it is possible to realize both the vehicle speed vsp and the target driving torque tTd at the lowest electric power consumption (the best efficiency of the motor/generator B), while accounting for both the motor/generator B efficiency and the power-transmission efficiency of the power-transmission mechanism (5, 6, 7), is, first of all, arithmetically calculated, and then the CVT 5 is controlled so that the actual transmission ratio of the CVT 5 is adjusted toward the target transmission ratio. For instance, the target transmission ratio of the CVT 5 may be map-retrieved on the basis of both the vehicle speed vsp and the target driving torque tTd, from a target-transmission-ratio characteristic map preprogrammed such that the vehicle speed vsp and the target driving torque tTd can be realized at the lowest electric power consumption. With the previously-noted arrangement, it is possible to operate the motor/generator B at the best motor/generator operating point for both the vehicle speed and the driver's required driving torque.

Additionally, the target transmission ratio of the CVT 5 can be computed accounting for both the motor/generator B efficiency and the power-transmission efficiency of the power-transmission mechanism (5, 6, 7). Thus, it is possible to accurately realize the time rate of doing work for the driver's required driving torque. Furthermore, such target transmission ratio as to realize both the vehicle speed and the target driving torque at the lowest electric power consumption, can be determined by way of map-retreival from the preprogrammed characteristic map, thus enabling easy and rapid arithmetic operation for the target transmission ratio (which ratio ensures the best motor/generator B operating point of the lowest electric power consumption), by means of a microcomputer.

In the system of the embodiment and the modifications previously described, it is preferable to limit the target generated electric energy tGEN to a specified electric power which can be allowed by the main battery 15. Also, it is preferable to limit the target torque tTb of the motor/generator B to an allowable torque which can be input or output by means of the motor/generator B, the inverter 12, and the main battery 15, so as to operate the motor/generator B, the inverter 12, and the main battery 15 within the respective allowable ranges. This enhances the reliability of the driving force control system, and thus increases the life of the system.

As will be appreciated from the above, according to the system of the embodiment, and the first to third modifications, such target engine speed tNi as to attain all of the vehicle speed vsp, the target driving torque tTd, and the target generated electric energy tGEN at the lowest fuel consumption, accounting for all of the engine efficiency, the motor/generator B efficiency, and the power-transmission efficiency of the power-transmission mechanism (5, 6, 7), is computed. As already discussed previously, the engine operating point of the best efficiency varies depending on the ratio of the required-driving-torque dependent power to the required-electric-energy-generation dependent power, as well as the sum of the required-driving-torque dependent power and the required-electric-energy-generation dependent power. Therefore, on the assumption that the sum of the target driving force (varying in proportion to the product of the vehicle speed and the target driving torque tTd) and the target generated electric energy tGEN is constant, the total energy loss tends to be affected by the power-generation loss in the motor/generator B rather than the power-transmission loss in the power-transmission mechanism (5, 6, 7), as the ratio of the required-electricenergy-generation dependent power to the ratio of the required-driving-torque dependent power (that is, the ratio of the target generated electric energy tGEN to the target driving force (=$c_p$·vsp·tTd, where $c_p$ denotes a proportional constant)) increases. On the same assumption, the total energy loss tends to be affected by the power-transmission loss in the power-transmission mechanism (5, 6, 7) rather than the power-generation loss in the motor/generator B, as the ratio of the target driving force (=$c_p$·vsp·tTd, where $c_p$ denotes a proportional constant)) to the target generated electric energy tGEN increases. According to the system of the embodiment, and the first to third modifications, the higher the ratio of the target generated electric energy tGEN to the target driving force (=$c_p$·vsp·tTd), the system generates the target engine speed tNi at which the motor/generator B can produce electric power at a highelectric-power-generationefficiency. Conversely, the higher the ratio of the target driving force (=$c_p$·vsp·tTd) to the target generated electric energy tGEN, the system generates the target engine speed tNi at which the power-transmission mechanism (5, 6, 7) can transmit power at a high power-transmission efficiency. Particularly, during low engine load (during normal driving of the vehicle without excessive depression of the accelerator), according to the system of the embodiment, the target engine speed can be set at a higher value, as the rate of the target generated electric energy tGEN with respect to the sum ($c_p$·vsp·tTd+tGEN) of the target driving force (=$c_p$·vsp·tTd) and the target generated electric energy tGEN becomes higher. Conversely, during the low engine load, as the rate of the target driving force (=$c_p$·vsp·tTd) with respect to the sum ($c_p$·vsp·tTd+tGEN) of the target driving force (=$c_p$·vsp·tTd) and the target generated electric energy tGEN becomes higher, the target engine speed can be set at a lower value. Thus, the system of the embodiment can tefficiently operate the engine 2 at the engine operating point of the lowest fuel consumption, even when the ratio of the target driving force (=$c_p$·vsp·tTd) to the target generated electric energy tGEN is varying.

The entire contents of Japanese Patent Application No. P11-38697 (filed Feb. 17, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A driving force control system for an automotive vehicle using driving torque produced by at least one of an internal combustion engine and an electric motor for propulsion, and including a battery giving and receiving electricity to and from the electric motor and a power-transmission mechanism having at least a continuously variable transmission for transmitting the driving torque therevia to drive wheels, said system comprising:

a vehicle speed sensor detecting vehicle speed;

an engine speed sensor detecting engine speed of the engine;

an accelerator sensor detecting an accelerator operating amount;

a battery state-of-charge detection device detecting a state of charge of the battery; and a control unit being configured to be electrically connected to the vehicle sensor, the engine speed sensor, the accelerator sensor, the battery state-of-charge detection device, the continuously variable transmission, the engine, and the electric motor, said control unit comprising:

(a) a target driving-torque calculation section which calculates a target driving torque on the basis of the vehicle speed and the accelerator operating amount, (b) a target generated-electric-energy calculation section which calculates a target generated electric energy on the basis of a deviation of the state of charge of the battery from a desired state of charge, (c) a target engine-speed calculation section which calculates a target engine speed needed to realize the vehicle speed, the target driving torque and the target generated electric energy at a lowest fuel consumption, considering an efficiency of each of the engine, the electric motor, and the power-transmission mechanism, (d) a target torque calculation section which calculates a target engine torque of the engine and a target motor torque of the electric motor, both needed to realize the target driving torque and the target generated electric energy, (e) a transmission ratio control section which controls a transmission ratio of the continuously variable transmission so that the engine speed is adjusted to the target engine speed, (f) an engine torque control section which controls the engine so that torque produced by the engine is adjusted to the target engine torque, and (g) a motor torque control section which controls the electric motor so that torque produced by the electric motor is adjusted to the target motor torque.

2. The driving force control system as claimed in claim 1, wherein said target engine-speed calculation section has a predetermined characteristic map ($MAP_{tni1}$) relating to the target engine speed (tNi) at which it is possible to realize the vehicle speed (vsp), the target driving torque (tTd), and the target generated electric energy (tGEN) at the lowest fuel consumption, and the target engine speed is retrieved on the basis of the vehicle speed, the target driving torque, and the target generated electric energy, from the predetermined characteristic map ($MAP_{tni1}$).

3. The driving force control system as claimed in claim 1, wherein said target engine-speed calculation section has fuel consumption data of the engine, electric-energy-generation efficiency data of the electric motor, and power-transmission efficiency data of the power-transmission mechanism, and calculates a fuel consumption (FuelS) of the engine needed to realize both the target driving torque (tTd) and the target generated electric energy (tGEN) on the basis of the fuel consumption data, the electric-energy-generation efficiency data, and the power-transmission efficiency data, within an engine speed range which can be produced actually by the engine, and sets the engine speed of the lowest fuel consumption at the target engine speed (tNi).

4. The driving force control system as claimed in claim 3, wherein the engine speed range used to calculate the fuel consumption (FuelS) by said target engine-speed calculation section is set at a predetermined speed range which can be produced by the continuously variable transmission depending on variations in the vehicle speed.

5. The driving force control system as claimed in claim 3, wherein the engine speed range used to calculate the fuel consumption (FuelS) by said target engine-speed calculation section is set at a predetermined speed range that the engine can realize a mechanical power corresponding to a sum of a time rate of doing work for the target driving torque and a time rate of doing work for the target generated electric energy.

6. The driving force control system as claimed in claim 1, wherein said target engine-speed calculation section has a predetermined characteristic map ($MAP_{tni1}$) relating to a basic value (tNi') of the target engine speed at which it is possible to realize the vehicle speed (vsp), the target driving torque (tTd), and the target generated electric energy (tGEN) at the lowest fuel consumption, and the basic value (tNi') of the target engine speed is retrieved on the basis of the vehicle speed, the target driving torque, and the target generated electric energy, from the predetermined characteristic map ($MAP_{tni1}$), and wherein said target engine-speed calculation section has fuel consumption data of the engine, electric-energy-generation efficiency data of the electric motor, and power-transmission efficiency data of the power-transmission mechanism, and calculates a fuel consumption (FuelS) of the engine needed to realize both the target driving torque (tTd) and the target generated electric energy (tGEN) on the basis of the fuel consumption data, the electric-energy-generation efficiency data, and the power-transmission efficiency data, in close vicinity to the basic value (tNi') of the target engine speed within an engine speed range which can be produced actually by the engine, and sets the engine speed of the lowest fuel consumption at the target engine speed (tNi).

7. The driving force control system as claimed in claim 1, wherein said target engine-speed calculation section has a predetermined characteristic map ($MAP_{tni1}$) relating to a basic value (tNi') of the target engine speed at which it is possible to realize the vehicle speed (vsp), the target driving torque (tTd), and the target generated electric energy (tGEN) at the lowest fuel consumption, and the basic value (tNi') of the target engine speed is retrieved on the basis of the vehicle speed, the target driving torque, and the target generated electric energy, from the predetermined characteristic map ($MAP_{tni1}$), and wherein said target engine-speed calculation section has fuel consumption data of the engine, electric-energy-generation efficiency data of the electric motor, and power-transmission efficiency data of the power-transmission mechanism, and calculates a fuel consumption (FuelS) of the engine needed to realize both the target driving torque (tTd) and the target generated electric energy (tGEN) on the basis of the fuel consumption data, the electric-energy-generation efficiency data, and the power-transmission efficiency data, so that the basic value (tNi') of the target engine speed is set at an initial value and so that the fuel consumption for each engine speed is calculated while increasing or decreasing in turn in revolution/minutes by a predetermined value from the initial value within an engine speed range which can be produced actually by the engine, and sets an engine speed, given when the fuel consumption (FuelS) is changed from a decreasing tendency to an increasing tendency, at the target engine speed (tNi).

8. The driving force control system as claimed in claim 1, wherein said target torque calculation section calculates an engine output shaft torque T1 on the basis of the engine speed, the vehicle speed (vsp), and the target driving torque (tTd) in such a manner to realize the target driving torque while compensating for power-transmission loss of the power-transmission mechanism, and an equivalent engine output shaft torque T2 on the basis of the motor rotational speed (Nb) and the target generated electric energy (tGEN) in such a manner to realize the target generated electric energy while compensating for energy loss of the electric motor, and sets a sum of the engine output shaft torque T1 and the equivalent engine output shaft torque T2 at the target engine torque, and sets a torque value (−(estTe−Tcvt)), obtained by subtracting an engine-torque estimate from the engine output shaft torque T1, is set at the target motor torque (tTb).

9. The driving force control system as claimed in claim 2, wherein said target motor-rotational-speed calculation section has a predetermined characteristic map ($MAP_{tni0}$) relating to the target motor rotational speed (tNi) at which it is possible to realize the vehicle speed (vsp) and the target driving torque (tTd) at the lowest electric power consumption, and the target motor rotational speed is retrieved on the basis of the vehicle speed and the target driving torque, from the predetermined characteristic map ($MAP_{tni0}$).

10. The driving force control system as claimed in claim 1, wherein said target engine-speed calculation section calculates a target transmission ratio of the continuously variable transmission needed to realize the vehicle speed (vsp), the target driving torque (tTd) and the target generated electric energy (tGEN) at the lowest fuel consumption, considering an efficiency of each of the engine, the electric motor, and the power-transmission mechanism, in lieu of calculation for the target engine speed (tNi), and wherein said transmission ratio control section controls the continuously variable transmission so that the transmission ratio is adjusted to the target transmission ratio.

11. The driving force control system as claimed in claim 1, wherein said target generated-electric-energy calculation section calculates the target generated electric energy (tGEN) so that the target generated electric energy (tGEN) is limited to a specified electric power which can be allowed by the battery, and wherein said target torque calculation section calculates the target motor torque (tTb) so that the target motor torque is limited to an allowable torque which can be input and output to and from the electric motor, a driving circuit for the electric motor, and the battery.

12. The driving force control system as claimed in claim 1, wherein said target engine-speed calculation section calculates the target engine speed, so that the electric motor can generate electricity at a higher electric-energy-generation efficiency, as a rate of the target generated electric energy (tGEN) with respect to a sum of the target generated electric energy (tGEN) and a target driving force ($c_p \cdot vsp \cdot tTd$) proportional to a product of the vehicle speed (vsp) and the target driving torque (tTd) becomes higher.

13. The driving force control system as claimed in claim 1, wherein said target engine-speed calculation section calculates the target engine speed, so that the power-transmission mechanism can transmit power at a higher power-transmission efficiency, as a rate of a target driving force ($c_p \cdot vsp \cdot tTd$) proportional to a product of the vehicle speed (vsp) and the target driving torque (tTd) with respect to a sum of the target generated electric energy (tGEN) and the target driving force ($c_p \cdot vsp \cdot tTd$) becomes higher.

14. The driving force control system as claimed in claim 1, wherein, during low engine load, said target engine-speed calculation section sets the target engine speed at a higher value, as a rate of the target generated electric energy (tGEN) with respect to a sum of the target generated electric energy (tGEN) and a target driving force ($c_p \cdot vsp \cdot tTd$) proportional to a product of the vehicle speed (vsp) and the target driving torque (tTd) becomes higher.

15. The driving force control system as claimed in claim 1, wherein, during low engine load, said target engine-speed calculation section sets the target engine speed at a lower value, as a rate of a target driving force ($c_p \cdot vsp \cdot tTd$) proportional to a product of the vehicle speed (vsp) and the target driving torque (tTd) with respect to a sum of the target generated electric energy (tGEN) and the target driving force ($c_p \cdot vsp \cdot tTd$) becomes higher.

16. A driving force control system for an automotive vehicle using driving torque produced by an electric motor for propulsion, and including a battery giving and receiving electricity to and from the electric motor and a power-transmission mechanism having at least a continuously variable transmission for transmitting the driving torque therevia to drive wheels, said system comprising:
   a vehicle speed sensor detecting vehicle speed;
   a motor speed sensor detecting a motor rotational speed of the electric motor;
   an accelerator sensor detecting an accelerator operating amount; and
   a control unit being configured to be electrically connected to the vehicle sensor, the motor speed sensor, the accelerator sensor, the continuously variable transmission, and the electric motor, said control unit comprising:

(a) a target driving-torque calculation section which calculates a target driving torque on the basis of the vehicle speed and the accelerator operating amount,
(b) a target motor-rotational-speed calculation section which calculates a target motor rotational speed needed to realize the vehicle speed and the target driving torque at a lowest electric power consumption, considering an efficiency of each of the electric motor and the power-transmission mechanism,
(c) a target torque calculation section which calculates a target motor torque of the electric motor needed to realize the target driving torque,
(d) a transmission ratio control section which controls a transmission ratio of the continuously variable transmission so that the motor rotational speed is adjusted to the target motor rotational speed,
(e) a motor torque control section which controls the electric motor so that torque produced by the electric motor is adjusted to the target motor torque.

17. A driving force control system for a parallel hybrid vehicle using driving torque produced by at least one of an internal combustion engine and an electric motor for propulsion, and including a battery giving and receiving electricity to and from the electric motor and a power-transmission mechanism having at least a continuously variable transmission for transmitting the driving torque therevia to drive wheels, said system comprising:
   a vehicle speed sensor detecting vehicle speed;
   an engine speed sensor detecting engine speed of the engine;
   an accelerator sensor detecting an accelerator operating amount;
   a battery state-of-charge detection device detecting a state of charge of the battery; and
   a control unit being configured to be electrically connected to the vehicle sensor, the engine speed sensor, the accelerator sensor, the battery state-of-charge detection device, the continuously variable transmission, the engine, and the electric motor, said control unit comprising:
   (a) a target driving-torque calculation means for calculating a target driving torque on the basis of the vehicle speed and the accelerator operating amount,
   (b) a target generated-electric-energy calculation means for calculating a target generated electric energy on the basis of a deviation of the state of charge of the battery from a desired state of charge,
   (c) a target engine-speed calculation means for calculating a target engine speed needed to realize the vehicle speed, the target driving torque and the target generated electric energy at a lowest fuel consumption, considering an efficiency of each of the engine, the electric motor, and the power-transmission mechanism,
   (d) a target torque calculation means for calculating a target engine torque of the engine and a target motor torque of the electric motor, both needed to realize the target driving torque and the target generated electric energy,
   (e) a transmission ratio control means for controlling a transmission ratio of the continuously variable transmission so that the engine speed is adjusted to the target engine speed,
   (f) an engine torque control means for controlling the engine so that torque produced by the engine is adjusted to the target engine torque, and (g) a motor torque control means for controlling the electric motor so that torque produced by the electric motor is adjusted to the target motor torque.

18. The driving force control system as claimed in claim 16, wherein said target motor-rotational-speed calculation section has electric-energy-generation efficiency data of the electric motor and power-transmission efficiency data of the power-transmission mechanism, and calculates an electric power consumption (ElecS) of the electric motor needed to realize the target driving torque (tTd) on the basis of the electric-energy-generation efficiency data and the power-transmission efficiency data, within a motor rotational speed range which can be produced actually by the electric motor, and sets the motor rotational speed of the lowest electric power consumption at the target motor rotational speed (tNi).

19. The driving force control system as claimed in claim 18, wherein the motor rotational speed range used to calculate the electric power consumption (ElecS) by said target motor-rotational-speed calculation section is set at a predetermined speed range which can be produced by the continuously variable transmission depending on variations in the vehicle speed.

20. The driving force control system as claimed in claim 18, wherein the motor rotational speed range used to calculate the electric power consumption (ElecS) by said target motor-rotational-speed calculation section is set at a predetermined speed range that the electric motor can realize the target driving torque.

21. The driving force control system as claimed in claim 16, wherein said target motor-rotational-speed calculation section has a predetermined characteristic map ($MAP_{tni0}$) relating to a basic value (tNi') of the target motor rotational speed at which it is possible to realize the vehicle speed (vsp) and the target driving torque (tTd) at the lowest electric power consumption, and the basic value (tNi') of the target motor rotational speed is retrieved on the basis of the vehicle speed and the target driving torque, from the predetermined characteristic map ($MAP_{tni0}$), and wherein said target motor-rotational-speed calculation section has output efficiency data of the electric motor and power-transmission efficiency data of the power-transmission mechanism, and calculates an electric power consumption (ElecS) of the electric motor needed to realize the target driving torque (tTd) on the basis of the output efficiency data of the electric motor and the power-transmission efficiency data, in close vicinity to the basic value (tNi') of the target motor rotational speed within a motor rotational speed range which can be produced actually by the electric motor, and sets the motor rotational speed of the lowest electric power consumption at the target motor rotational speed (tNi).

22. The driving force control system as claimed in claim 16, wherein said target motor-rotational-speed calculation section has a predetermined characteristic map ($MAP_{tni0}$) relating to a basic value (tNi') of the target motor rotational speed at which it is possible to realize the vehicle speed (vsp) and the target driving torque (tTd) at the lowest electric power consumption, and the basic value (tNi') of the target motor rotational speed is retrieved on the basis of the vehicle speed and the target driving torque, from the predetermined characteristic map ($MAP_{tni0}$), and wherein said target motor-rotational-speed calculation section has output efficiency data of the electric motor and power-transmission efficiency data of the power-transmission mechanism, and calculates an electric power consumption (ElecS) of the electric motor needed to realize the target driving torque (tTd) on the basis of the output efficiency data of the electric motor and the power-transmission efficiency data, so that the basic value (tNi') of the target motor rotational speed is set at an initial value and so that the electric power consumption for each motor rotational speed is calculated while increasing or decreasing in turn in revolution/minutes by a predetermined value from the initial value within a motor rotational speed range which can be produced actually by the electric motor, and sets a motor rotational speed, given when the electric power consumption (ElecS) is changed from a decreasing tendency to an increasing tendency, at the target motor rotational speed (tNi).

23. The driving force control system as claimed in claim 1, wherein said target torque calculation section calculates the target driving torque on the basis of vehicle operating conditions and traffic environment in lieu of the accelerator operating amount detected by said accelerator sensor.

24. The driving force control system as claimed in claim 16, wherein said target motor-rotational-speed calculation section calculates a target transmission ratio of the continuously variable transmission needed to realize the vehicle speed (vsp) and the target driving torque (tTd) at the lowest electric energy consumption, considering an efficiency of each of the electric motor and the power-transmission mechanism, in lieu of calculation for the target motor rotational speed (tNi), and wherein said transmission ratio control section controls the continuously variable transmission so that the transmission ratio is adjusted to the target transmission ratio.

25. A driving force control system for an automotive vehicle using driving torque produced by at least one of an internal combustion engine and an electric motor for propulsion, and including a battery giving and receiving electricity to and from the electric motor, a clutch disposed between the engine and electric motor, and a power-transmission mechanism having at least a continuously variable transmission for transmitting the driving torque therevia to drive wheels, and capable of selecting one of application of driving torque produced by the engine, application of driving torque produced by the electric motor, and application of driving torque produced by the engine and the motor depending on whether the clutch is in an engaged state or in a disengaged state, said system comprising:

a vehicle speed sensor detecting vehicle speed;

an engine speed sensor detecting engine speed of the engine;

a motor speed sensor detecting a motor rotational speed of the electric motor;

an accelerator sensor detecting an accelerator operating amount;

a battery state-of-charge detection device detecting a state of charge of the battery; and a control unit being configured to be electrically connected to the vehicle sensor, the engine speed sensor, the motor speed sensor, the accelerator sensor, the battery state-of-charge detection device, the continuously variable transmission, the engine, and the electric motor, said control unit comprising:

(a) a target driving-torque calculation section which calculates a target driving torque on the basis of the vehicle speed and the accelerator operating amount;

(b) a target generated-electric-energy calculation section which calculates a target generated electric energy on the basis of a deviation of the state of charge of the battery from a desired state of charge, (c) a target engine-speed calculation section which calculates a target engine speed needed to realize the vehicle speed, the target driving torque and the target generated electric energy at a lowest fuel consumption, considering an efficiency of each of the engine, the electric motor, and the power-transmission mechanism, (d) a target motor-rotational-speed calculation section which calculates a target motor rotational speed needed to realize the vehicle speed and the target driving torque at a lowest electric power consumption, considering an efficiency of each of the electric motor and the power-transmission mechanism, (e) a target torque calculation section which calculates a target engine torque of the engine and a target motor torque of the electric motor, both needed to realize the target driving torque and the target generated electric energy, (f) a transmission ratio control section which controls a transmission ratio of the continuously variable transmission so that the motor rotational speed is adjusted to the target motor rotational speed when the clutch is in the disengaged state, and so that the engine speed is adjusted to the target engine speed when the clutch is in the engaged state, (g) an engine torque control section which controls the engine so that torque produced by the engine is adjusted to the target engine torque, and (h) a motor torque control section which controls the electric motor so that torque produced by the electric motor is adjusted to the target motor torque.

26. The driving force control system as claimed in claim 25, wherein, when the clutch is in the engaged state, said target torque calculation section calculates an engine output shaft torque T1 on the basis of the engine speed, the vehicle speed (vsp), and the target driving torque (tTd) in such a manner to realize the target driving torque while compensating for power-transmission loss of the power-transmission mechanism, and an equivalent engine output shaft torque T2 on the basis of the motor rotational speed (Nb) and the target generated electric energy (tGEN) in such a manner to realize the target generated electric energy while compensating for energy loss of the electric motor, and sets a sum of the engine output shaft torque T1 and the equivalent engine output shaft torque T2 at the target engine torque, and sets a torque value (−(estTe−Tcvt)), obtained by subtracting an engine-torque estimate from the engine output shaft torque T1, is set at the target motor torque (tTb), and wherein, when the clutch is in the disengaged state, said target torque calculation section calculates a motor torque on the basis of the motor rotational speed (Nb), the vehicle speed (vsp), and the target driving torque (tTd) in such a manner to realize the target driving torque while compensating for power-transmission loss of the power-transmission mechanism, and sets the motor torque calculated at the target motor torque (tTb).

27. A driving force control system for an automotive vehicle using driving torque produced by at least one of an internal combustion engine and an electric motor for propulsion, and including a battery giving and receiving electricity to and from the electric motor, a clutch disposed between the engine and electric motor, and a power-transmission mechanism having at least a continuously variable transmission for transmitting the driving torque therevia to drive wheels, and capable of selecting one of application of driving torque produced by the engine, application of driving torque produced by the electric motor, and application of driving torque produced by the engine and the motor depending on whether a clutch-engagement request is present or a clutch-disengagement request is present, said system comprising:

a vehicle speed sensor detecting vehicle speed;

an engine speed sensor detecting engine speed of the engine;

a motor speed sensor detecting a motor rotational speed of the electric motor;

an accelerator sensor detecting an accelerator operating amount;

a battery state-of-charge detection device detecting a state of charge of the battery; and a control unit being configured to be electrically connected to the vehicle sensor, the engine speed sensor, the motor speed sensor, the accelerator sensor, the battery state-of-charge detection device, the continuously variable transmission, the engine, and the electric motor, said control unit comprising:

(a) a target driving-torque calculation section which calculates a target driving torque on the basis of the vehicle speed and the accelerator operating amount, (b) a target generated-electric-energy calculation section which calculates a target generated electric energy on the basis of a deviation of the state of charge of the battery from a desired state of charge, (c) a target engine-speed calculation section which calculates a target engine speed needed to realize the vehicle speed, the target driving torque and the target generated electric energy at a lowest fuel consumption, considering an efficiency of each of the engine, the electric motor, and the power-transmission mechanism, (d) a target motor-rotational-speed calculation section which calculates a target motor rotational speed needed to realize the vehicle speed and the target driving torque at a lowest electric power consumption, considering an efficiency of each of the electric motor and the power-transmission mechanism, (e) a target torque calculation section which calculates a target engine torque of the engine and a target motor torque of the electric motor, both needed to realize the target driving torque and the target generated electric energy, (f) a transmission ratio control section which controls a transmission ratio of the continuously variable transmission so that the motor rotational speed is adjusted to the target motor rotational speed when the clutch-disengagement request is present, and so that the engine speed is adjusted to the target engine speed when the clutch-engagement request is present, (g) an engine torque control section which controls the engine so that torque produced by the engine is adjusted to the target engine torque, and (h) a motor torque control section which controls the electric motor so that torque produced by the electric motor is adjusted to the target motor torque.

28. The driving force control system as claimed in claim 16, wherein said target torque calculation section calculates a motor torque on the basis of the motor rotational speed (Nb), the vehicle speed (vsp), and the target driving torque (tTd) in such a manner to realize the target driving torque while compensating for power-transmission loss of the power-transmission mechanism, and sets the motor torque calculated at the target motor torque (tTb).

* * * * *